US012716851B2

(12) United States Patent
Ota et al.

(10) Patent No.: US 12,716,851 B2
(45) Date of Patent: Aug. 25, 2026

(54) TABLET SPECTROSCOPIC MEASUREMENT METHOD

(71) Applicant: Ushio Denki Kabushiki Kaisha, Tokyo (JP)

(72) Inventors: Aya Ota, Tokyo (JP); Go Yamada, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 567 days.

(21) Appl. No.: 18/246,297

(22) PCT Filed: Aug. 5, 2021

(86) PCT No.: PCT/JP2021/029197
§ 371 (c)(1),
(2) Date: Mar. 22, 2023

(87) PCT Pub. No.: WO2022/064874
PCT Pub. Date: Mar. 31, 2022

(65) Prior Publication Data

US 2023/0375465 A1 Nov. 23, 2023

(30) Foreign Application Priority Data

Sep. 23, 2020 (JP) ................................ 2020-158727

(51) Int. Cl.
*G01N 21/95* (2006.01)
*G01N 21/03* (2006.01)
(Continued)

(52) U.S. Cl.
CPC ......... *G01N 21/9508* (2013.01); *G01N 21/27* (2013.01); *G01N 21/3563* (2013.01);
(Continued)

(58) Field of Classification Search
CPC ................................................ G01N 21/9508
See application file for complete search history.

(56) References Cited

U.S. PATENT DOCUMENTS 4,482,966 A * 11/1984 Mito ...................... G01N 30/74 73/23.4
5,298,963 A * 3/1994 Moriya .............. G01N 21/9501 356/600
(Continued)

FOREIGN PATENT DOCUMENTS

CN 110730903 A 1/2020
JP 2011-191129 A 9/2011
(Continued)

OTHER PUBLICATIONS

Johansson J. et al., "Time-Resolved NIR/Vis Spectroscopy for Analysis of Solids: Pharmaceutical Tablets", Applied Spectroscopy, 56(6), Jun. 2002, pp. 725-731.
(Continued)

*Primary Examiner* — Rufus L Phillips
(74) *Attorney, Agent, or Firm* — Studebaker Brackett PLLC

(57) ABSTRACT

Provided is a high-speed and high-accuracy tablet spectroscopic measurement technology that enables total inspection. A pulsed light irradiation system irradiates a tablet being linearly moved by a movement mechanism with pulsed light in which an elapsed time in each pulse and a wavelength correspond to each other on a one-to-one basis, the output from a light receiver that has received transmission light from the tablet is input to a calculation means via an AD converter and an FPGA as an integration means, and a spectral transmission spectrum is calculated. In a case where the variation in spectral characteristic is measured, grouping is performed for multiple times of pulsed light
(Continued)

irradiation performed on different locations, integration is separately performed, spectral transmission spectra are calculated and then compared.

10 Claims, 14 Drawing Sheets

(51) Int. Cl.

| | |
|---|---|
| ***G01N 21/27*** | (2006.01) |
| ***G01N 21/3563*** | (2014.01) |
| ***G01N 21/88*** | (2006.01) |
| *G01N 21/31* | (2006.01) |
| *G01N 21/359* | (2014.01) |

(52) U.S. Cl.

CPC . *G01N 21/8806* (2013.01); *G01N 2021/3133* (2013.01); *G01N 21/359* (2013.01); *G01N 2021/8845* (2013.01); *G01N 2201/08* (2013.01)

(56) References Cited

U.S. PATENT DOCUMENTS

| | | | | |
|---|---|---|---|---|
| 2010/0302539 | A1* | 12/2010 | Myrick .................. | G01N 21/31 356/326 |
| 2013/0256534 | A1* | 10/2013 | Micheels ........... | G01N 21/8507 250/339.07 |
| 2016/0373663 | A1 | 12/2016 | Ghetler | |
| 2020/0166406 | A1 | 5/2020 | Ota et al. | |
| 2021/0389237 | A1 | 12/2021 | Yamada et al. | |

FOREIGN PATENT DOCUMENTS

| | | | |
|---|---|---|---|
| JP | 2013-205390 A | | 10/2013 |
| JP | 2013205390 | * | 10/2013 |
| JP | 2019-155422 A | | 9/2019 |
| WO | 2020/075441 A1 | | 4/2020 |

OTHER PUBLICATIONS

The extended European search report issued by the European Patent Office on Feb. 8, 2024, which corresponds to European Patent Application No. 21872006.8-1020 and is related to U.S. Appl. No. 18/246,297.

International Search Report issued in PCT/JP2021/029197; mailed Oct. 12, 2021.

International Preliminary Report on Patentability and Written Opinion issued in PCT/JP2021/029197; issued Mar. 28, 2023.

Youichi, Nagamura, Health food products without cGMP are banned from sale in the U.S., Foocom, Dec. 19, 2011, pp. 1-5, [online] www.foocom.net/column/takou/5381.

Ozaki, Yukihiro, Near-Infrared Spectral Analysis, Kodansha Ltd., Mar. 23, 2015, pp. 59 to 75.

An Office Action mailed by the Indian Patent Office on Sep. 19, 2025, which corresponds to Indian Patent Application 202317025503 and is related to U.S. Appl. No. 18/246,297.

An Office Action; mailed by the China National Intellectual Property Administration of the People's Republic of China on Feb. 27, 2026, which corresponds to Chinese Patent Application No. 202180055503.7 and is related to U.S. Appl. No. 18/246,297.

* cited by examiner

CPU
1
3
31
32
33
11
111
112
13
131
14
15
2
21
4
400
50
51
52
53
54
6
60
61
62
621
622
8
P

FIG. 4

| CHANNEL | CENTER WAVELENGTH | REFERENCE INTENSITY | MEASUREMENT VALUE | SPECTRAL TRANSMISSION SPECTRUM |
|---|---|---|---|---|
| $C_1$ | $\lambda_1$ | $V_1$ | $v_1$ | $v_1/V_1$ |
| $C_2$ | $\lambda_2$ | $V_2$ | $v_2$ | $v_2/V_2$ |
| $C_3$ | $\lambda_3$ | $V_3$ | $v_3$ | $v_3/V_3$ |
| ⋮ | ⋮ | ⋮ | ⋮ | ⋮ |
| $C_{n-2}$ | $\lambda_{n-2}$ | $V_{n-2}$ | $v_{n-2}$ | $v_{n-2}/V_{n-2}$ |
| $C_{n-1}$ | $\lambda_{n-1}$ | $V_{n-1}$ | $v_{n-1}$ | $v_{n-1}/V_{n-1}$ |
| $C_n$ | $\lambda_n$ | $V_n$ | $v_n$ | $v_n/V_n$ |

(a-1)

(a-2)

(a-3)

(b-1)

(b-2)

(b-3)

(c-1)

P

B (c-2)

(c-3)

(1-1)

(1-2)

(2-1)

(2-2)

P

B

B (2)

1
11
111
621
622
62
112
16
171
17
51
172
P
P
P
4
4
2
52
53
54
60
3
CPU
31
32
33
61
6
21
8
400

FIG. 14

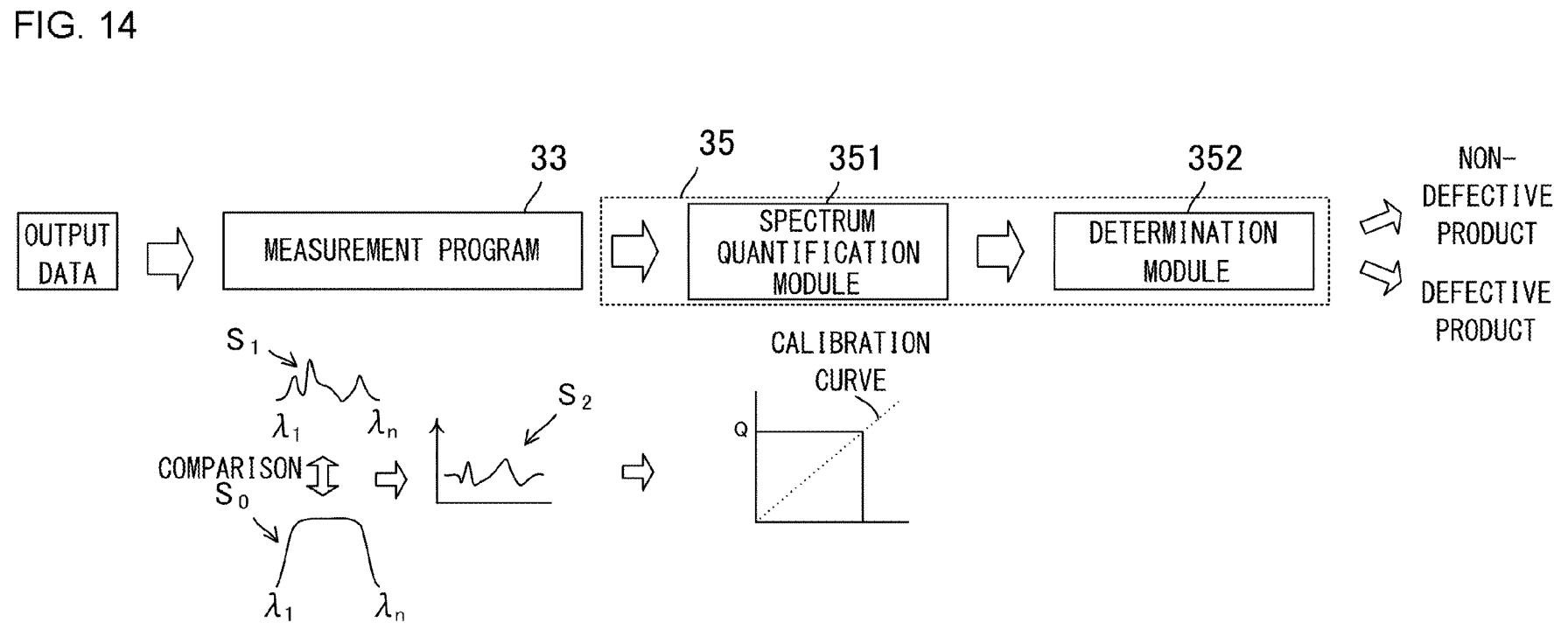

OUTPUT DATA

33

MEASUREMENT PROGRAM

35

351

SPECTRUM QUANTIFICATION MODULE

352

DETERMINATION MODULE

NON-DEFECTIVE PRODUCT

DEFECTIVE PRODUCT $S_1$ $\lambda_1$ $\lambda_n$

COMPARISON $S_0$ $\lambda_1$ $\lambda_n$ $S_2$

CALIBRATION CURVE

Q

TABLET SPECTROSCOPIC MEASUREMENT METHOD

BACKGROUND

1. Technical Field

The invention of this application relates to a spectroscopic measurement technology for tablets, and in particular, to an inspection technology for manufactured tablets.

2. Description of the Related Art

In recent years, the demand for maintaining the quality of tablets has been particularly increased. This tendency is applied to not only tablet as medicines but also tablets as health foods. For example, in the United States, it is mandatory to acquire current good manufacturing practice (cGMP) not only for tablets as medicines but also for tablets as health foods. In Japan, related organizations are also conducting studies to make it mandatory to acquire the GMP.

PRIOR ART DOCUMENT

Patent Literature

Patent Literature 1 JP 2019-155422 A
Patent Literature 2 JP 2011-191129 A

Non-Patent Literature

Non-Patent Literature 1 http://www.foocom.net/column/takou/5381/25
Non Patent Literature 2 "Near-infrared spectroscopy", written and edited by OZAKI Yukihiro, published by KODANSHA, pages 59 to 75

In the manufacturing process of tablets, total inspection is desirable to keep the quality of the manufactured tablets higher. However, in the current manufacturing line of tablets, a practical technology that enables total inspection has not been developed. In order to perform total inspection in the manufacturing line in which a large number of tablets are manufactured and conveyed, it is necessary to perform the inspection in a short time and with high accuracy, but such a technology has not been developed. For this reason, at present, only sampling inspection is periodically performed and analysis is performed by an analysis apparatus such as a chromatography apparatus in order to confirm the quality of the product.

Under such circumstances, Patent Literature 1 and Patent Literature 2 disclose a technology for inspecting tablets based on a result obtained by irradiating the tablets with light.

However, among these Patent Literatures, Patent Literature 1 discloses that quality inspection of molded products such as tablets is performed with light irradiation, but does not disclose what kind of light is specifically radiated and what principle the quality is inspected based on. Patent Literature 2 discloses that laser light is radiated in order to inspect whether the tablets are different products, but does not specifically disclose that the quality of the tablets is inspected.

SUMMARY

The invention of the present application has been made in view of such circumstances, and an object of the present invention is to provide an excellent spectroscopic measurement technology that can be applied to quality inspection of tablets required to have high quality as an oral product, and is to provide a high-speed and high-accuracy tablet spectroscopic measurement technology that enables total inspection.

In order to solve the above problems, the present specification discloses the invention of a tablet spectroscopic measurement method for measuring spectral transmission spectra of tablets.

There is provided a tablet spectroscopic measurement method including:

- an irradiation step of irradiating the tablet with pulsed light in which an elapsed time in each pulse and a wavelength correspond to each other on a one-to-one basis; and
- a calculation processing step of performing calculation processing on an output from a light receiver that receives transmission light from the tablet irradiated with the pulsed light in the irradiation step, and obtaining a spectral transmission spectrum of the tablet,
- in which a size of a beam of the pulsed light radiated in the irradiation step on a light incident surface of the tablet is smaller than the size of the light incident surface of the tablet.

In the tablet spectroscopic measurement method, the beam of the pulsed light may have such a size that two or more beams of the pulsed light can be incident to the light incident surface in a state of not overlapping each other.

Furthermore, in the tablet spectroscopic measurement method, the irradiation step may be a step of irradiating one tablet with the pulsed light multiple times, and the irradiation may be performed multiple times on locations different from each other on the light incident surface.

Furthermore, in the tablet spectroscopic measurement method,

- the irradiation step may be a step of irradiating one tablet with the pulsed light multiple times,
- an integration step of integrating the output from the light receiver may be provided,
- the integration step may be a step of integrating, for respective wavelengths, values at times at which it is regarded that the output from the light receiver receives light having the same wavelength, and
- the calculation processing step may be a step of obtaining the spectral transmission spectrum according to respective integrated values for respective wavelengths.

Furthermore, in the tablet spectroscopic measurement method,

- an integration step of integrating the output from the light receiver may be provided,
- multiple times of irradiation with the pulsed light may be divided into a first group that is formed by irradiation to a first region on the light incident surface and a second group that is formed by irradiation to a second region different from the first region on the incident surface,
- the integration step may include a step of integrating, for respective wavelengths, values of the output corresponding to the first group from the light receiver at times at which it is regarded that the light receiver receives light having the same wavelength, and a step of integrating, for respective wavelengths, values of the output corresponding to the second group from the light receiver at times at which it is regarded that the light receiver receives light having the same wavelength, and the calculation processing step may be a step of obtaining the spectral transmission spectrum according to each value integrated in each group.

Furthermore, in the tablet spectroscopic measurement method, the irradiation step may be a step of irradiating the tablet being moved with the pulsed light.

Furthermore, in order to solve the above problems, the present specification discloses the invention of a tablet spectroscopic measurement apparatus for measuring spectral transmission spectra of tablets.

There is provided a tablet spectroscopic measurement apparatus including:

a pulsed light irradiation system that includes a pulsed light source emitting pulsed light in which an elapsed time in each pulse and a wavelength correspond to each other on a one-to-one basis, and irradiates a tablet with the pulsed light;

a light receiver that is disposed at a position receiving transmission light from the tablet which is irradiated with the pulsed light by the pulsed light irradiation system; and a calculation means that performs calculation processing on an output from the light receiver, and obtains a spectral transmission spectrum of the tablet, wherein a size of a beam radiated by the pulsed light irradiation system on a light incident surface of the tablet is smaller than the size of the light incident surface of the tablet.

In the tablet spectroscopic measurement apparatus, the beam of the pulsed light may have such a size that two or more beams can be incident to the light incident surface in a state of not overlapping each other.

Furthermore, in the tablet spectroscopic measurement apparatus, a tablet placement mechanism for placing the tablet at a position to which the pulsed light is radiated by the pulsed light irradiation system may be provided, the tablet placement mechanism may be a mechanism for placing the tablet such that one tablet is irradiated with the pulsed light multiple times, and the pulsed light may be radiated to locations different from each other on the light incident surface multiple times.

Furthermore, in the tablet spectroscopic measurement apparatus, a tablet placement mechanism for placing the tablet at a position to which the pulsed light is radiated by the pulsed light irradiation system may be provided, the tablet placement mechanism may be a mechanism for placing the tablet such that one tablet is irradiated with the pulsed light multiple times, an integration means that integrates the output from the light receiver may be provided, the integration means may be a means that integrates, for respective wavelengths, values of the output from the light receiver at times at which it is regarded that the light receiver receives light having the same wavelength, and the calculation means may be a means that obtains the spectral transmission spectrum according to each integrated value.

Furthermore, in the tablet spectroscopic measurement apparatus, an integration means that integrates the output from the light receiver may be provided, multiple times of irradiation with the pulsed light may be divided into a first group that is formed by irradiation to a first region on the light incident surface and a second group that is formed by irradiation to a second region different from the first region on the incident surface, the integration means may be a means that integrates, for respective wavelengths, values of the output corresponding to the first group from the light receiver at times at which it is regarded that the light receiver receives light having the same wavelength, and integrates, for respective wavelengths, values of the output corresponding to the second group from the light receiver at times at which it is regarded that the light receiver receives light having the same wavelength, and the calculation means may be a means that obtains a spectral transmission spectrum according to each value integrated in each group.

Furthermore, in the tablet spectroscopic measurement apparatus, a movement mechanism for moving the tablet may be provided, and the pulsed light irradiation system may be an irradiation system that irradiates the tablet being moved by the movement mechanism with the pulsed light.

Furthermore, in the tablet spectroscopic measurement apparatus, the tablet placement mechanism may be a movement mechanism for moving the tablet, and the pulsed light irradiation system may be an irradiation system that irradiates the tablet being moved by the tablet placement mechanism with the pulsed light.

Furthermore, in order to solve the above problems, the present specification discloses the invention of a tablet inspection method and the invention of a tablet inspection apparatus.

According to the disclosed invention, there is provided a tablet inspection method including: a measurement step of performing the tablet spectroscopic measurement method described above to obtain a spectral transmission spectrum of a tablet; and a determination step of determining quality of the tablet based on the spectral transmission spectrum obtained in the measurement step.

Furthermore, according to the disclosed invention, there is provided a tablet inspection apparatus including: the tablet spectroscopic measurement apparatus described above; and a determination means that determines quality of the tablet based on a spectral transmission spectrum that is a measurement result obtained by the tablet spectroscopic measurement apparatus.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 4 is a diagram schematically illustrating main sections of a measurement program included in a spectroscopic measurement apparatus;

FIG. 14 is a diagram illustrating an outline of a quality determination program.

DETAILED DESCRIPTION

Next, modes (embodiments) for carrying out the invention of this application will be described.

Figure 1:
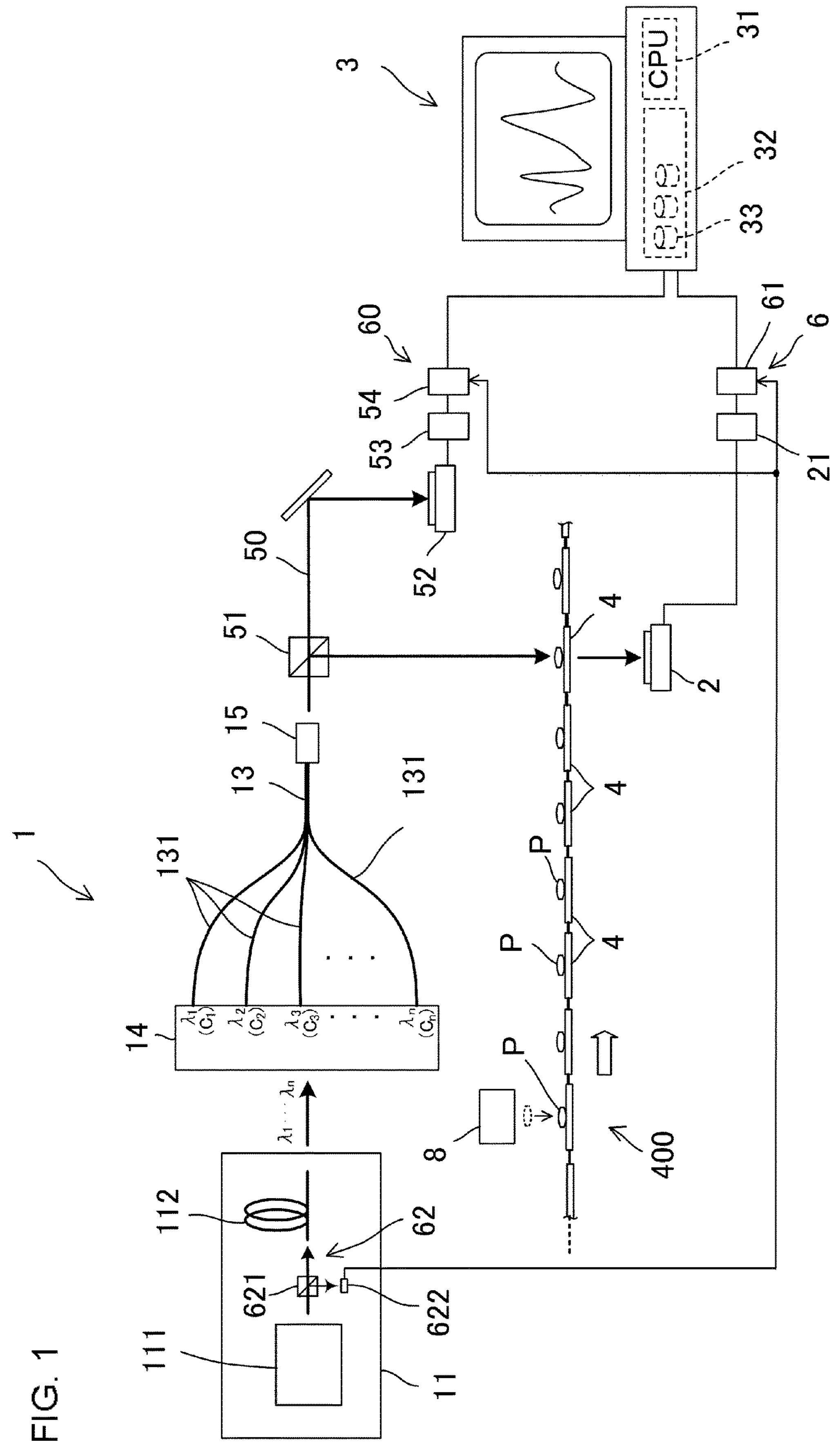
FIG. 1 is a schematic diagram of a tablet spectroscopic measurement apparatus according to an embodiment.

FIG. 1 is a schematic diagram of a tablet spectroscopic measurement apparatus according to an embodiment. One of the major features of this apparatus is that it is an apparatus that irradiates a tablet P with pulsed light in which the elapsed time and the wavelength correspond to each other on a one-to-one basis, and receives transmission light coming out from the tablet P at that time to perform spectroscopic measurement.

Specifically, the tablet spectroscopic measurement apparatus illustrated in FIG. 1 includes a pulsed light irradiation system 1, a light receiver 2, and a calculation means 3. The pulsed light irradiation system 1 includes a pulsed light source 11 and a correspondence means that realizes time-wavelength correspondence for the pulsed light from the pulsed light source 11.

As the pulsed light source 11, a light source that emits super-continuum light (hereinafter, it is referred to as SC light) is used in this embodiment. The SC light is light obtained by causing light from a pulse laser source (for example, an ultrashort pulse laser source) to pass through a nonlinear element such as a fiber and widening the wavelength by a nonlinear optical effect such as self-phase modulation or stimulated Raman scattering.

The pulsed light source 11 is a light source that emits pulsed light having a continuous spectrum. In this embodiment, for example, the light source emits light having a continuous spectrum over a wavelength range of at least 10 nm in a range of 900 nm to 1300 nm. The "continuous spectrum over a wavelength range of at least 10 nm in the range of 900 nm to 1300 nm" means any continuous wavelength range of 10 nm or more in the range of 900 nm to 1300 nm. For example, it may be continuous at 900 nm to 910 nm or may be continuous at 990 nm to 1000 nm. Note that, it is more preferable that the spectrum is continuous over a wavelength range of 50 nm or more, and it is still more preferable that the spectrum is continuous over a wavelength range of 100 nm or more. Furthermore, "Spectrum is continuous" means that the spectrum is continuous in a certain wavelength range. This is not limited to the case of being continuous in the entire spectrum of the pulsed light, and may be partially continuous.

The reason that the range is from 900 nm to 1300 nm is that the tablet spectroscopic measurement apparatus of the embodiment mainly performs spectroscopic analysis in a near-infrared range. The light having a continuous spectrum over a wavelength range of at least 10 nm is typically SC light. Therefore, in this embodiment, the pulsed light source 11 is an SC light source. However, a broadband pulsed light source other than the SC light source may be used.

The pulsed light source 11 as an SC light source includes a pulse laser 111 and a nonlinear element 112. As the pulse laser 11, a mode-lock laser, a microchip laser, a fiber laser, or the like can be used. Furthermore, a fiber is often used as the nonlinear element 112. For example, a photonic crystal fiber or another nonlinear fiber can be used as the nonlinear element 112. The mode of the fiber is often a single mode, but even a multimode can be used as the nonlinear element 112 as long as it exhibits sufficient nonlinearity.

Figure 2A:
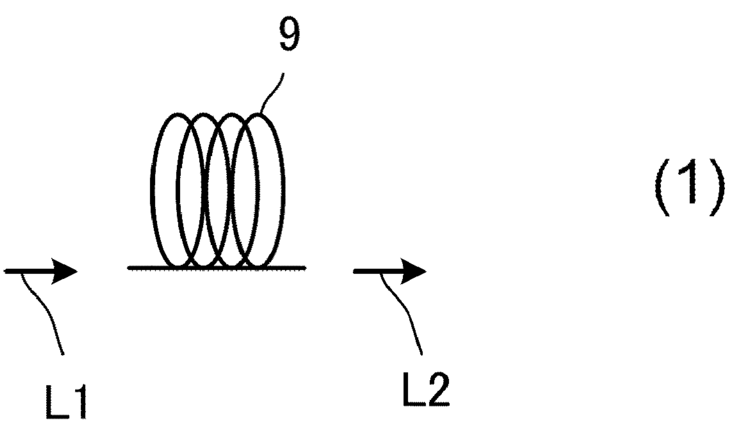
FIG. 2A and FIG. 2B are schematic diagrams illustrating correspondence between time and a wavelength in group velocity dispersion.
Figure 2B:
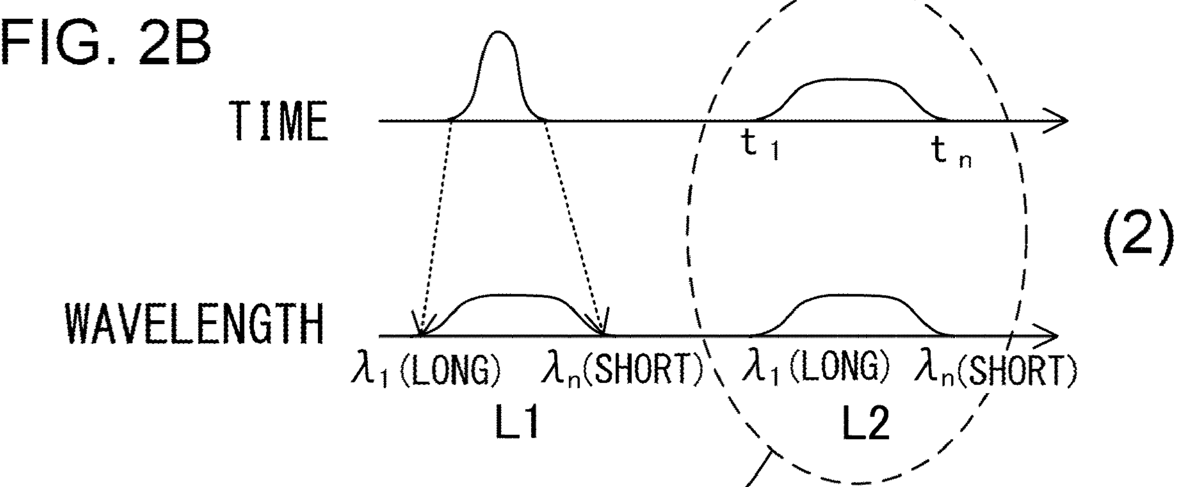
Figure 2B:
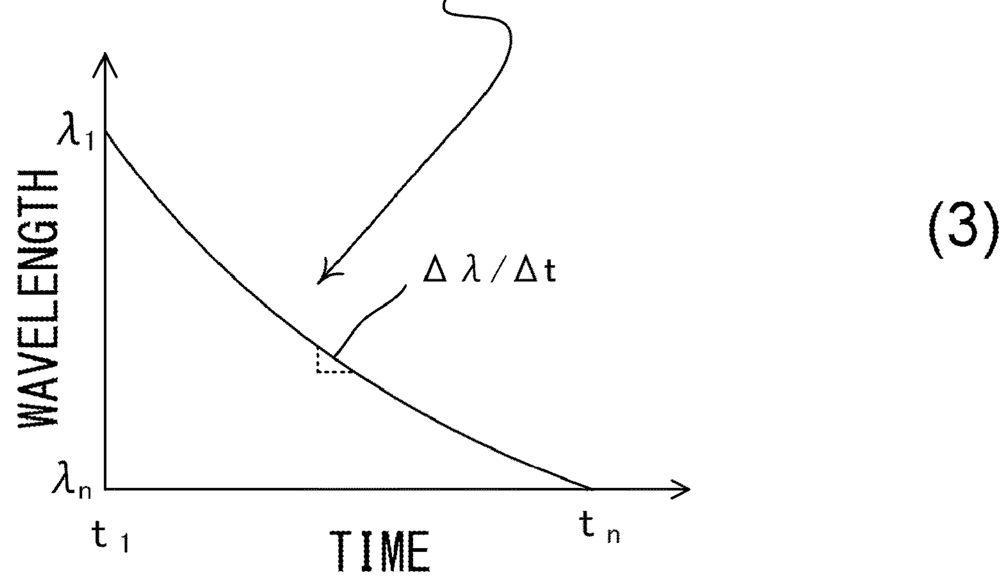

As described above, the correspondence means is a means that makes the relationship between the time and the wavelength be a one-to-one relationship. In this respect, description will be made with reference to FIGS. 2A and 2B. FIGS. 2A and 2B are schematic diagrams illustrating correspondence between the time and the wavelength in group velocity dispersion.

When SC light L1 having a continuous spectrum in a certain wavelength range passes through a group delay fiber 9 having a positive dispersion characteristic in the wavelength range, the pulse width is effectively stretched. As illustrated in FIG. 2A, in the SC light L1, light having a long wavelength $\lambda_1$ and light having a short wavelength $\lambda_n$ exist. When this light passes through a normal dispersion group delay fiber 9, in the normal dispersion group delay fiber 9, light having a shorter wavelength is propagated with a delay. Therefore, as illustrated in (2) in FIG. 2B, when a time difference in one pulse occurs, and the light is emitted from the fiber 9, light having the short wavelength is delayed as compared with light having the long wavelength. As a result, as illustrated in (3) of FIG. 2B, SC light L2 to be emitted is light of which the pulse width is stretched in a state in which the uniqueness of time to wavelength is secured. That is, times $t_1$ to $t_n$ are pulse-stretched in a one-to-one correspondence with wavelengths $\lambda_1$ to $\lambda_n$.

Note that, as the group delay fiber 9 for pulse stretching, an anomalous dispersion fiber can also be used. In this case, in the SC light, the light on the long wavelength side existing at the beginning of the pulse is delayed, and the light on the short wavelength side existing at the later time is dispersed in a traveling state. Therefore, the temporal relationship in one pulse is reversed, and pulse stretching is performed in a state in which the light on the short wavelength side exists at the beginning of one pulse and the light on the longer wavelength side exists with the lapse of time. However, as compared with the case of normal dispersion, it is often necessary to further increase a propagation distance for pulse stretching, and the loss tends to be large. Therefore, normal dispersion is preferable in this respect.

The pulse spectroscopic device according to the embodiment has, as a configuration for realizing time-wavelength correspondence, a configuration in which a plurality of fibers corresponding the split number is connected to the splitting element for splitting into a plurality of the wavelengths and performs optimization to obtain the time-wavelength correspondence with a length of each fiber instead of the configuration in which the group velocity dispersion in one fiber is used as described above. This is because an unintended nonlinear optical effect in the fiber is suppressed, and the time-wavelength correspondence is stably realized.

A plurality of the fibers constitute a bundle fiber 13 in this embodiment. On the incident side of the bundle fiber 13, the splitting element for splitting light to allow the light to enter fibers 131 (hereinafter, referred to as a delay fiber) constituting the bundle fiber 13 is provided. As the splitting element, an element that splits light according to a wavelength is used, and in this embodiment, an arrayed waveguide grating (AWG) 14 is used. That is, in the present embodiment, the arrayed waveguide grating 14 and the bundle fiber 13 constitute a correspondence means.

Figure 3:
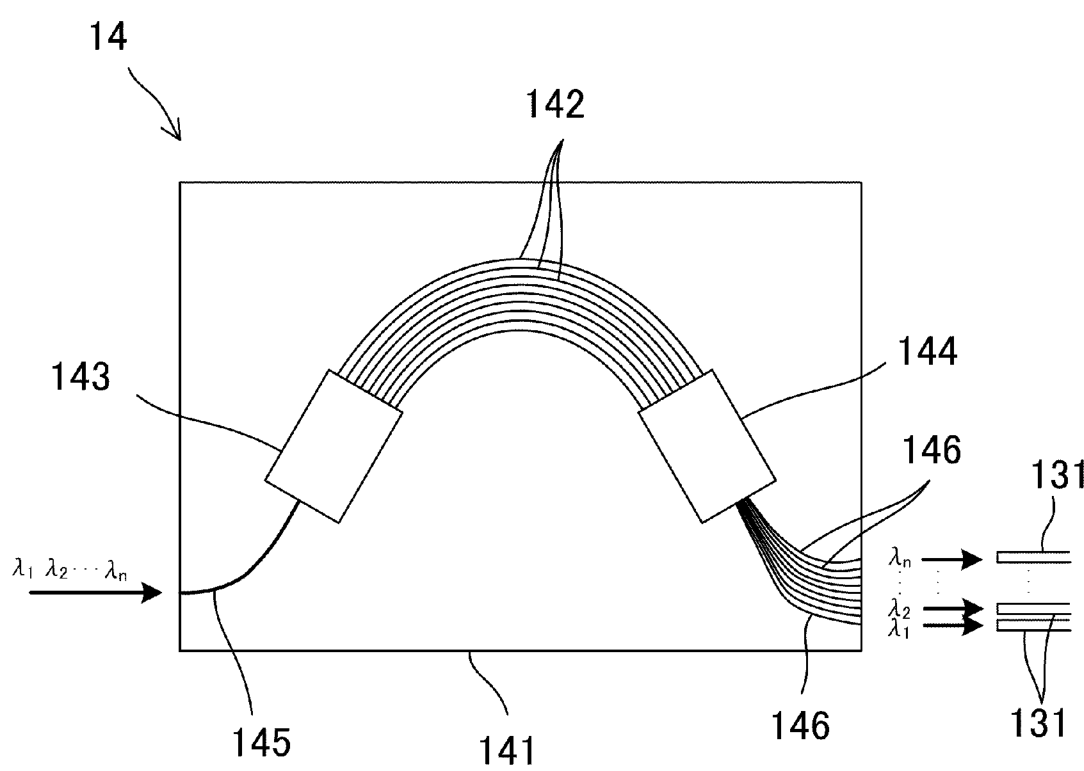
FIG. 3 is a schematic plan view of an arrayed waveguide grating used as a splitting element.

FIG. 3 is a schematic plan view of the arrayed waveguide grating used as the splitting element. The arrayed waveguide grating is an element developed for optical communication, and is not generally used for spectroscopic measurement. As illustrated in FIG. 3, the arrayed waveguide grating 14 is configured by forming functional waveguides 142 to 146 on a substrate 141. The functional waveguides include a large number of arrayed waveguides 142 having optical path lengths slightly different from each other, slab waveguides 143 and 144 connected to opposite ends (incident side and emission side) of the arrayed waveguides 142, an incident-side waveguide 145 that causes light to be incident on the incident-side slab waveguide 143, and emission-side waveguides 146 that extract light having each wavelength from the emission-side slab waveguide 144.

The slab waveguides 143 and 144 are free spaces, and light incident through the incident-side waveguide 145 spreads in the incident-side slab waveguide 143 and is incident on each of the arrayed waveguides 142. Since the lengths of the arrayed waveguides 142 are slightly different from each other, the phases of the light beams reaching the ends of the arrayed waveguides 142 are different by the difference. The light is diffracted and emitted from each of the arrayed waveguides 142, but the diffracted light beams pass through the emission-side slab waveguide 144 while interfering with each other and reach the incident ends of the emission-side waveguides 146. At this time, the interference light has the highest intensity at a position corresponding to the wavelength due to the phase difference. That is, the light beams having sequentially different wavelengths are incident on the emission-side waveguides 146, and the light is spatially split. Strictly speaking, each of the emission-side waveguides 146 is formed such that each incident end is located at such a position that the light is split in such a manner.

Each of the delay fibers 131 in the bundle fiber 13 is connected to each of the emission-side waveguides 146. The length of each of the delay fibers 131 varies depending on the wavelength of the light to be transmitted, and the delay amount differs for each wavelength. When the light beams emitted from the delay fibers 131 are overlapped (multiplexed) on an object S, similarly to the case of pulse stretching, a state is obtained in which light, in which the time and the wavelength correspond to each other on one-to-one basis, is radiated.

Note that, as described above, even in a case where transmission is simply performed through one fiber, one-to-one correspondence between time and wavelength can be realized by using a fiber having an appropriate dispersion characteristic. However, since wavelength dispersion is generally not constant with respect to a wavelength, time differences for each wavelength are not uniform. Therefore, the wavelength resolution depends on the wavelength. In a configuration in which the wavelength is divided by the arrayed waveguide grating 14 and the length of each of the delay fibers 131 is changed according to the wavelength, the wavelength resolution is determined at the time of the wavelength division and each delay, and thus, it is meaningful to make the wavelength resolution uniform in the entire measurement wavelength range.

The pulsed light irradiation system 1 includes an emission-end unit 15 as illustrated in FIG. 1 in order to irradiate the tablet P with the light having the time-wavelength correspondence as described above. The emission-end unit 15 is a unit provided at an emission end of the bundle fiber 13. The emission-end unit 15 is a unit that causes light emitted from each delay fiber 131 of the bundle fiber 13 to be collected to one tablet P and to be radiated, and appropriately includes a lens and the like. Hereinafter, the light collected to one tablet P is referred to as synthetic pulsed light since the light, which is originally one piece of pulsed light, is divided and then is collected to the same object P and radiated.

A holding member that holds the tablet P is provided at the position to which the synthetic pulsed light is radiated by the pulsed light irradiation system 1. In this embodiment, since it is configured to radiate the pulsed light from the upper side, the holding member is a receiving jig 4. Furthermore, since the apparatus of this embodiment is an apparatus that measures the spectral transmission characteristic of the tablet P, the receiving jig 4 is transparent, and the light receiver 2 is provided at a position receiving the transmission light. In addition, a configuration, in which a hole or slit narrower than the width of the tablet P is provided in the receiving jig 4, and the light receiver 2 receives transmission light through the hole or the slit, may be adopted.

Furthermore, in this embodiment, a configuration, in which a reference measurement value is acquired in real time, is adopted. That is, as illustrated in FIG. 1, a beam splitter 51 that splits an optical path extending from the emission-end unit 15 is provided. One of the split optical paths is for measurement and reaches the light receiver 2 through the tablet P. The other optical path 50 is a reference optical path, and a reference light receiver 52 is disposed on this optical path. The light (reference light) traveling through the reference optical path 50 reaches the reference light receiver 52 without passing through the tablet P.

As the calculation means 3, a general-purpose PC is used in this embodiment. Moreover, an AD converter 21 is provided between the light receiver 2 and the calculation means 3, and the output of the light receiver 2 is input to the calculation means 3 via the AD converter 21. Furthermore, a reference AD converter 53 is also provided between the reference light receiver 52 and the calculation means 3, and the output of the reference light receiver 52 is also digitized and input to the calculation means 3.

The calculation means 3 includes a processor 31 and a storage (hard disk, memory, and the like) 32. In the storage 32, a measurement program 33 for processing output data from the light receiver 2 and calculating a spectrum and other necessary programs are installed. FIG. 4 is a diagram schematically illustrating main sections of the measurement program included in the spectroscopic measurement apparatus.

In this embodiment, the measurement program 33 is a program for measuring a spectral transmission spectrum. When the spectral transmission spectrum is calculated, reference spectral intensity is used. The reference spectral intensity is a value for each wavelength serving as a reference for calculating the spectral transmission spectrum. In this embodiment, the reference spectral intensity is the output from the reference light receiver 52, which is obtained from the input via the reference AD converter 53 (real-time reference spectral intensity).

In this embodiment, the light beams split according to the wavelength by the arrayed waveguide grating 14 is delayed with a time difference in each delay fiber 131 of the bundle fiber 13, and thus correspondence between time and wavelength is secured. Each emission part, in which light is split for each wavelength by the arrayed waveguide grating 14 and output, is referred to as a channel. The output from the light receiver 2 is integrated in a time zone corresponding to the output of each channel. The same applies to the reference light receiver 52. The reference intensity ($V_1$, $V_2$, $V_3$, . . . ) is stored as a value obtained by integration in each of the channels $C_1$, $C_2$, $C_3$, . . . .

The reference intensities $V_1$, $V_2$, $V_3$, . . . in the channels $C_1$, $C_2$, $C_3$, . . . are intensities corresponding wavelengths $\lambda_1$, $\lambda_2$, $\lambda_3$, . . . . The corresponding wavelengths $\lambda_1$, $\lambda_2$, $\lambda_3$, . . . are respectively center wavelengths in the channels $C_1$, $C_2$, $C_3$, . . . of the arrayed waveguide grating 14. Then, a relationship between times $t_1$, $t_2$, $t_3$, . . . in the entire synthetic pulsed light and the center wavelengths $\lambda_1$, $\lambda_2$, $\lambda_3$, . . . in the respective channels $C_1$, $C_2$, $C_3$ . . . is examined in advance, and the values $V_1$, $V_2$, $V_3$, . . . obtained by integration in the respective channels $C_1$, $C_2$, $C_3$, . . . are treated as reference intensities at the respective wavelengths $\lambda_1$, $\lambda_2$, $\lambda_3$, . . . .

Then, the output from the light receiver 2 that has received the light that has passed through the tablet P is similarly integrated in each of the channels $C_1$, $C_2$, $C_3$, . . . via the AD converter 21, and is stored in the memory as a value (measurement value) of each of the wavelengths $\lambda_1$, $\lambda_2$, $\lambda_3$, . . . ($v_1$, $v_2$, $v_3$, . . . ). Each measurement value is compared with the reference intensity ($v_1/V_1$, $v_2/V_2$, $v_3/V_3$, . . . ), and the result thereof is a spectral transmission spectrum. Then, when necessary, the logarithm of the reciprocal is taken to obtain an absorbance spectrum. The measurement program 33 is programmed so as to perform calculation processing as described above.

Note that, in practice, as will be described later, although not illustrated, the measurement AD converter 21 and the reference AD converter 53 need to perform sampling in synchronization, and thus a synchronization circuit for sharing a clock signal is provided.

Figure 5A:
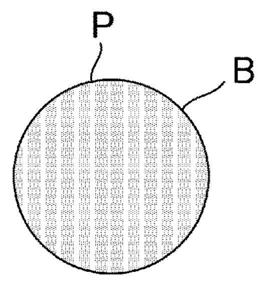
FIGS. 5A-5C are schematic views illustrating a relationship between a size of a beam of synthetic pulsed light to be radiated and a size of a tablet.
Figure 5A:
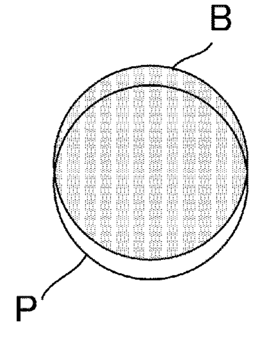
Figure 5A:
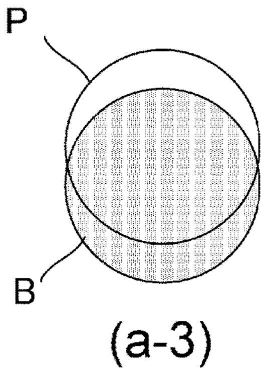
Figure 5B:
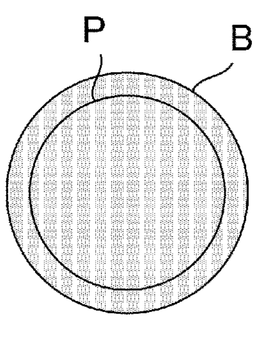
Figure 5B:
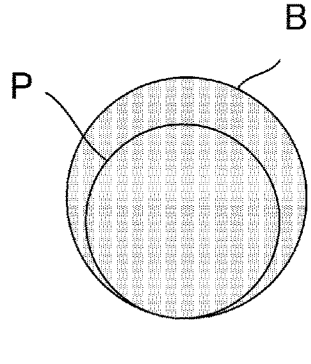
Figure 5B:
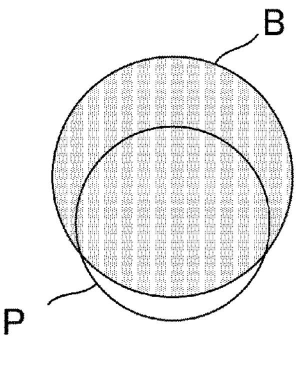
Figure 5C:
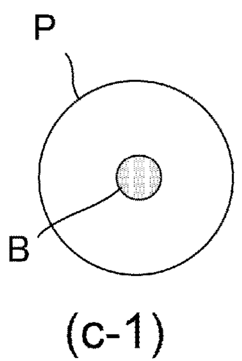
Figure 5C:
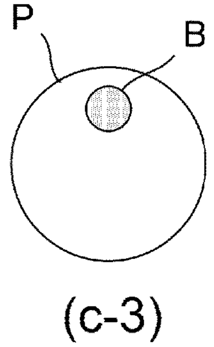

Such a tablet spectroscopic measurement apparatus optimizes the size of the beam of the synthetic pulsed light to be radiated in consideration of the fact that the object to be measured is a tablet. In this respect, description will be made below. FIGS. 5A-5C are schematic views illustrating a relationship between the size of a beam of synthetic pulsed light to be radiated and the size of a tablet. In FIGS. 5A-5C, the beam of the synthetic pulsed light is indicated by B.

Note that, in this embodiment, as described above, measurement light is the synthetic pulsed light and is the light emitted from each delay fiber 131 of the bundle fiber 13. In a case where the pulsed light beams emitted from each delay fiber 131 are condensed on a tablet by the emission-end unit 15 and radiated thereon, when the beams from each delay fiber 131 do not completely overlap each other, the beam B in FIGS. 5A-5C indicates a pattern of one of the beams. Furthermore, there is also a case where irradiation is performed with a light condensing position slightly shifted with respect to the tablet when the position of the tablet is shifted during conveyance. In a case where irradiation is performed with the slightly shifted light condensing position, the position of the beam B in FIGS. 5A-5C indicates one of the positions.

In the tablet spectroscopic measurement apparatus of the embodiment, from the viewpoint of measuring the spectral characteristic of the entire tablet without excess or deficiency, the beam B of the measurement light (light with which the tablet P is irradiated for spectroscopic measurement) has desirably the same size as the tablet P. This is illustrated in portions (a-1), (a-2), and (a-3) of FIG. 5A.

However, in a case where the size of the measurement light is the same as the size of the tablet P, it is necessary to accurately position the tablet P with respect to the irradiation location of the measurement light. That is, as illustrated in portion (a-2) and 5(a-3) of FIG. 5A, when the beam B is shifted and radiated, a region in which the measurement light is not radiated is partially formed, and the amount of light transmitted through the tablet P and reaching the light receiver 2 changes. In this case, it is difficult to determine whether the variation in the output of the light receiver 2 is a change in the amount of transmission light due to the shift of the beam B or a difference in the light transmittance of the tablet P itself, and as a result, the reliability of measurement decreases. Moreover, the light shifted from the tablet P is a cause of stray light, and easily generates a noise component in the output of the light receiver 2.

In order to avoid such a problem, the tablet P is only required to be positioned by a positioning mechanism with respect to the beam B. However, providing a separate positioning mechanism for the tablet P causes an increase in apparatus cost. Furthermore, an expensive mechanism is required to accurately position a small tablet P, and it is necessary to prevent the tablet P from being damaged at the time of positioning, and the degree of difficulty of mechanism design is also high. Moreover, in order not to deteriorate productivity, it is desirable to perform measurement by radiating measurement light in a state in which the tablet P flows (moves) in the manufacturing line, but in this case, positioning is practically impossible.

In consideration of such a problem, as illustrated in portions (b-1), (b-2), and (b-3) of FIG. 5B, it is conceivable to irradiate the tablet P with the beam B slightly larger than the tablet P. In this case, as illustrated in (b-2) of FIG. 5B, the tablet P is irradiated with all the measurement light when the irradiation position is slightly shifted, but when the irradiation position is shifted greatly, the tablet P is shifted from the beam B, and the same problem as described above occurs. In order to avoid this, it is conceivable to further increase that size of the beam B, but the amount of light not radiated (not used for measurement) to the tablet P increases, and a problem of a decrease in light utilization efficiency occurs.

On the other hand, as illustrated in portions (c-1), (c-2), and (c-3) of FIG. 5C, in a case where spectroscopic measurement is performed by irradiating the tablet P with a small beam B, even when the tablet P is shifted from the irradiation position, the tablet P is entirely irradiated with light, and the above-described problem does not occur. When the size of the beam B is made sufficiently small with respect to the tablet P, highly accurate positioning of the tablet P becomes unnecessary. "Sufficiently small" means that the size of the beam B is, for example, ¾ or less, ⅔ or less, or ½ or less with respect to the size of the tablet P. Note that, in a case where the pulsed light beams emitted from each delay fiber 131 are radiated with a slightly shifted irradiation position, the size covering all the beams is, for example, ¾ or less, ⅔ or less, or ½ or less with respect to the size of the tablet P.

The size comparison is performed by using a diameter in a case where both the tablet and the beam are circular. The tablet may not be circular in some cases, but in this case, it can be defined by how many beams enter the light incident surface of the tablet without overlapping each other. The example of this is illustrated in FIGS. 6A-6D. FIGS. 6A-6D are views illustrating comparison between the size of the tablet and the size of the beam.

Figure 6A:
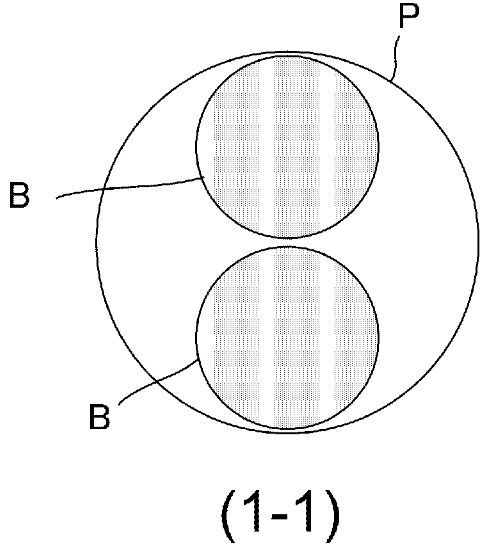
FIGS. 6A-6D are views illustrating comparison between a size of a tablet and a size of a beam.
Figure 6B:
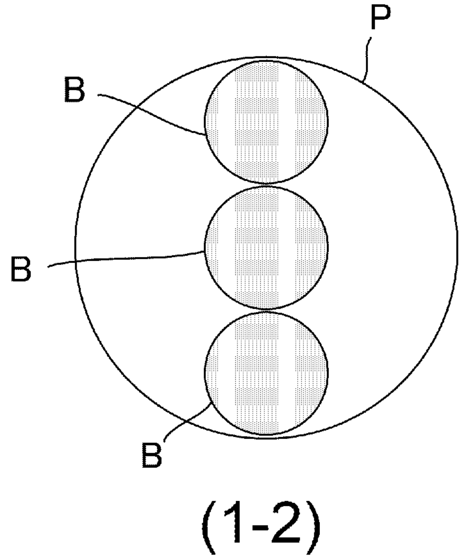
Figure 6C:
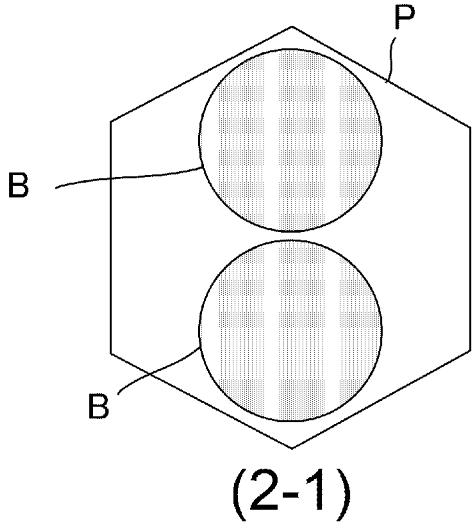
Figure 6D:
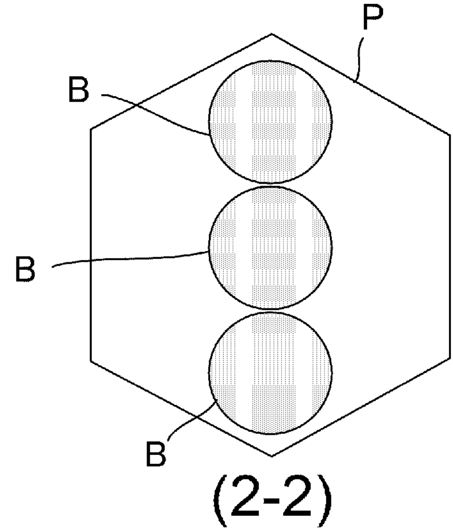

FIGS. 6A and 6B illustrate examples in which the light incident surface of the tablet P is circular. Furthermore, FIGS. 6C and 6D illustrate examples in which the light incident surface of the tablet P is regular hexagonal instead of being circular. FIGS. 6A and 6C are examples in which the beam size is ½ or less, and at least two beams B are present on the light incident surface of the tablet P. Furthermore, FIGS. 6B and 6D are examples in which the beam size is ⅓ or less, and are examples in which at least three beams B are present.

When the size ratio is set such that at least two beams B are included, the size of the beam B is ½ or less of the size of the tablet P. Therefore, even when the irradiation position of the beam B is shifted, the possibility of deviating from the tablet P is further reduced. In addition, as will be described later, two or more different locations can be irradiated with the pulsed light, which is suitable for measuring the distribution of the spectral transmission characteristic of the tablet P and for measuring the variation in the spectral transmission characteristic depending on the location.

Note that, there may be a case where the emission-end unit 15 includes a condenser lens and emits the light as the beam B having a small pattern as described above by the condenser lens.

Another major feature of the tablet spectroscopic measurement apparatus according to the embodiment is that, as described above, one tablet P is irradiated with a small beam of the synthetic pulsed light multiple times, light transmitted through the tablet P when irradiated multiple times is received by the light receiver 2, and an output thereof is subjected to calculation processing to obtain a result of spectroscopic measurement. In this respect, description will be made below.

In order to measure the amount of a specific component contained in a tablet, it is necessary to use light having a wavelength absorbed by the component to be measured. Therefore, the light transmittance of the tablet P is usually a low value of 1% or less. The light transmittance in this case is the light transmittance in a wavelength range to be measured, and is, for example, a transmittance of light in a near-infrared range.

When the spectroscopic measurement is performed on the tablet P having a low light transmittance with only one time of radiation of the synthetic pulsed light, the intensity of the transmission light received by the light receiver 2 is weak, and thus the SN ratio is extremely lowered due to the influence of the noise component caused by the stray light or the background light. Therefore, it is difficult to obtain a measurement result with sufficiently high accuracy. In this embodiment, in consideration of this point, the synthetic pulsed light is radiated to one tablet P multiple times, and the output from the light receiver 2 when the synthetic pulsed light is radiated multiple times is integrated. Specifically, the tablet spectroscopic measurement apparatus of the embodiment includes a tablet placement mechanism for placing one tablet P at an irradiation position such that one tablet P is irradiated with the synthetic pulsed light multiple times, and an integration means 6 that integrates the output from the light receiver 2 when the one tablet P is irradiated with the synthetic pulsed light multiple times.

As the tablet placement mechanism, various mechanisms are conceivable. In this embodiment, in order to further optimize the multiple radiation of the synthetic pulsed light with respect to the tablet P, the multiple radiation of the synthetic pulsed light with respect to one tablet P is performed at different locations. More specifically, in this embodiment, the tablet placement mechanism is a tablet movement mechanism 400 that moves the tablet P so as to pass through the irradiation position of the synthetic pulsed light.

As illustrated in FIG. 1, the receiving jigs 4 have a plate shape, are arranged in a horizontal direction, and are connected to each other. The tablet movement mechanism 400 is a mechanism that moves the receiving jigs 4 in a direction in which the receiving jigs 4 are arranged.

As the tablet movement mechanism 400, a belt conveyor system in which a ring-shaped belt on which tablets are placed is rotationally moved along an endless path to convey the tablets or a system in which a disk on which the tablets are adsorbed is rotationally moved on a circumferential surface is also conceivable. In these cases, it is not necessary to use a member such as the receiving jig 4. A narrow slit or small diameter through-hole is formed on the belt or disk and each of the tablets is placed on the slit or hole. The transmission light transmitted through the tablet is received by the light receiver 2 through the slit or the hole. While the tablet is moved by the tablet movement mechanism 400, the tablet is irradiated with pulsed light multiple times.

Note that, a placement mechanism 8 for placing tablets P one by one on each receiving jig 4 is provided on a movement path on the upstream side of the irradiation position. The placement mechanism 8 is configured such that, for example, tablets P are delivered one by one to the receiving jig 4 from a hopper filled with a large number of tablets P via a feeder (not illustrated) that arranges the tablets in a line or multiple lines. In addition, the tablet P may be moved by a robot including an arm capable of holding the tablet P at the distal end.

In the present embodiment, the movement by the tablet movement mechanism 400 is linear movement at a constant speed, but may not be the movement at the constant speed and the linear movement. The tablet P on each receiving jig is irradiated with the pulsed light multiple times when passing through the irradiation position. That is, the movement speed in the tablet movement mechanism 400 is optimized in relation to the repetition frequency of the pulsed light, such that one tablet P is irradiated with the pulsed light multiple times.

Figure 7:
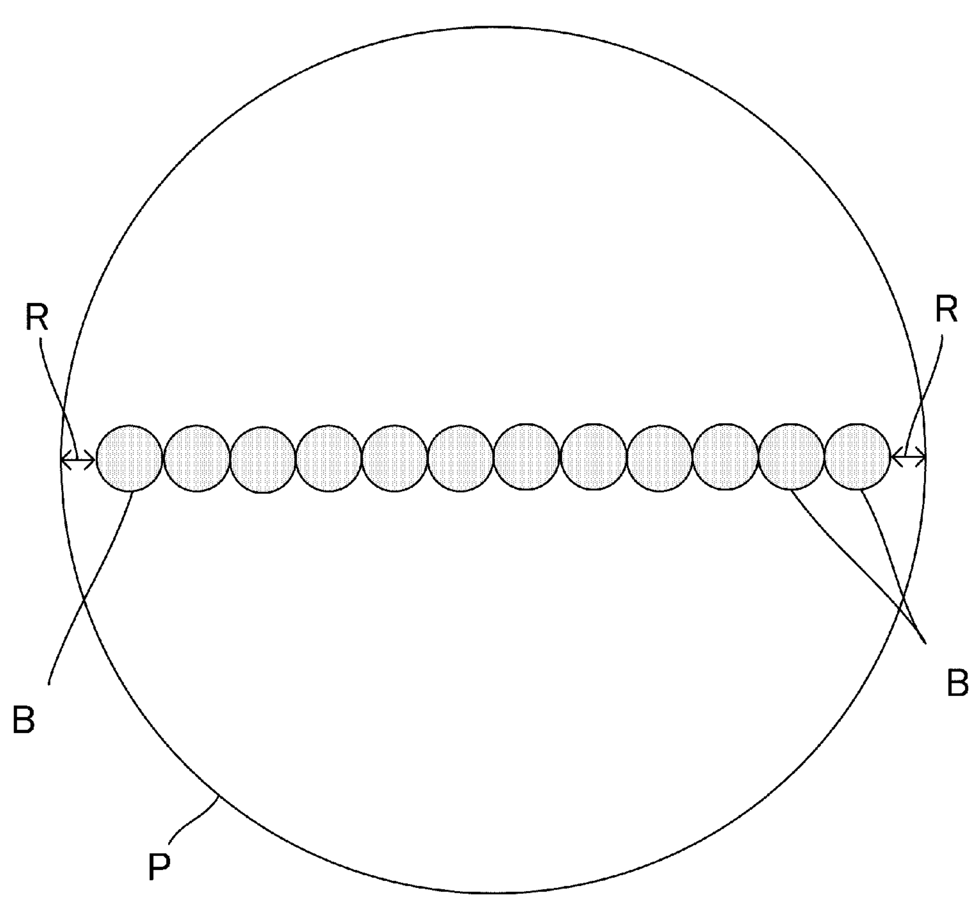
FIG. 7 is a view illustrating an example of a pattern when pulsed light is radiated to a tablet multiple times.

FIG. 7 is a view illustrating an example of a pattern when the synthetic pulsed light is radiated to the tablet P multiple times. In this example, one tablet P is set to be irradiated with the synthetic pulsed light 12 times. The beam of the synthetic pulsed light when being radiated one time is indicated by B in FIG. 7. As illustrated in FIG. 7, the tablet P is moved through the irradiation position without stopping, and at this time, pulsed light beams are radiated. Therefore, as illustrated in FIG. 7, the beams B are arranged on a straight line. In FIG. 7, the beams B are in contact with each other, but this is not essential, and the beams B may be slightly separated or slightly overlapped.

More specifically, for example, in a case where the tablet P has a disk shape (tablet shape) with a diameter of about 6 mm, one beam B has a diameter of about 1 mm. In this case, in a case where the repetition frequency of the pulsed light is about 2.4 kHz, when the movement speed of the tablet P (movement speed of the receiving jig 4) is set to about 1 m/s, 12 beams (12 times of irradiation with the pulsed light) arranged in this manner are radiated.

Note that, in the example illustrated in FIG. 7, when the diameter of the tablet P is exactly 12 times the beam B, the beam B deviates from the tablet P and is radiated even when a timing is slightly shifted. Therefore, a margin R in consideration of the shift in timing is set. The size is set such that 12 beams B are present including the margin R.

Furthermore, in order to optimize the timing at which the synthetic pulsed light is radiated to the tablet P multiple times when the tablet P is moved, a configuration in which a shutter is provided in the pulsed light irradiation system or a control signal for controlling the timing of oscillation is input to a pulse laser source 111 can be adopted.

Note that, the number of times of integration can be increased by increasing the repetition frequency of the pulsed light. In the case of random noise, since a noise width is inversely proportional to the square root of the number of times of integration, a higher SN ratio can be obtained by increasing the number of times of integration.

The configuration in which different locations on one tablet P are irradiated with the pulsed light multiple times as described above is provided with several different reasons. One of the reasons is for the heat resistance of the tablet P. When the same location is irradiated with the pulsed light multiple times, heat is accumulated, and depending on the heat resistance of the tablet P, thermal damage such as deterioration or burning may be caused to the tablet P. When different locations are irradiated, the accumulation of the heat is suppressed, and the thermal damage is prevented.

Another reason is for variations in components of the tablet P depending on a location on the tablet P. In the tablet P, it is desirable that the variations in components of the tablet P depending on the location on the tablet P is small. The tablet P often has a scoring line, and may be divided into two or the like with this scoring line and taken. For this reason, there are variations in components, and the amount of the active component may be particularly small or excessively great in a divided side, which may cause product defects. Therefore, from the viewpoint of quality inspection of the tablet P, it is preferable that spectroscopic measurement can be performed on a plurality of different locations on the tablet P. In consideration of this point, the tablet spectroscopic measurement apparatus of the embodiment is configured such that the pulsed light irradiation is performed multiple times at different locations on the tablet P.

Next, the configuration of the integration means 6 will be described.

As described above, the integration means 6 is configured to increase the SN ratio in consideration of the low light transmittance of the tablet P. Then, the tablet spectroscopic measurement apparatus of the embodiment is an apparatus that irradiates the tablet P with light multiple times, in which the elapsed time in the synthetic pulsed light and the wavelength of the light correspond on a one-to-one basis. Accordingly, the integration means 6 is a means that integrates a value at a time at which the outputs (synthetic pulse output) from the light receiver 2 when the synthetic pulsed light is radiated multiple times are considered to have the same wavelength. In this embodiment, the integration means 6 is a means that performs integration by hardware, and a field programmable gate array (FPGA) 61 is used as the integration means 6.

In this embodiment, a reference time provision unit is provided in order to further optimize the integration in the integration means 6. The reference time provision unit is an element that provides, to the integration means 6, a reference time for specifying times at which the outputs from the light receiver 2 when the synthetic pulsed light beams are radiated are considered to have the same wavelength. In this embodiment, a trigger signal generation unit 62 that generates a trigger signal having a predetermined temporal relationship with respect to each pulsed light beam reaching the light receiver 2 is adopted as the reference time provision unit. More specifically, the trigger signal generation unit 62 that generates a trigger signal as a pulsed light source 10 emits the synthetic pulsed light beams is adopted.

As illustrated in FIG. 1, the trigger signal generation unit 62 generates a trigger signal by extracting and detecting some of the outputs of the pulse laser source 111. That is, the trigger signal generation unit 62 includes a beam splitter 621 that extracts some of the outputs from the pulse laser source 111 and a trigger signal light receiver 622 that detects the extracted light.

Figure 8:
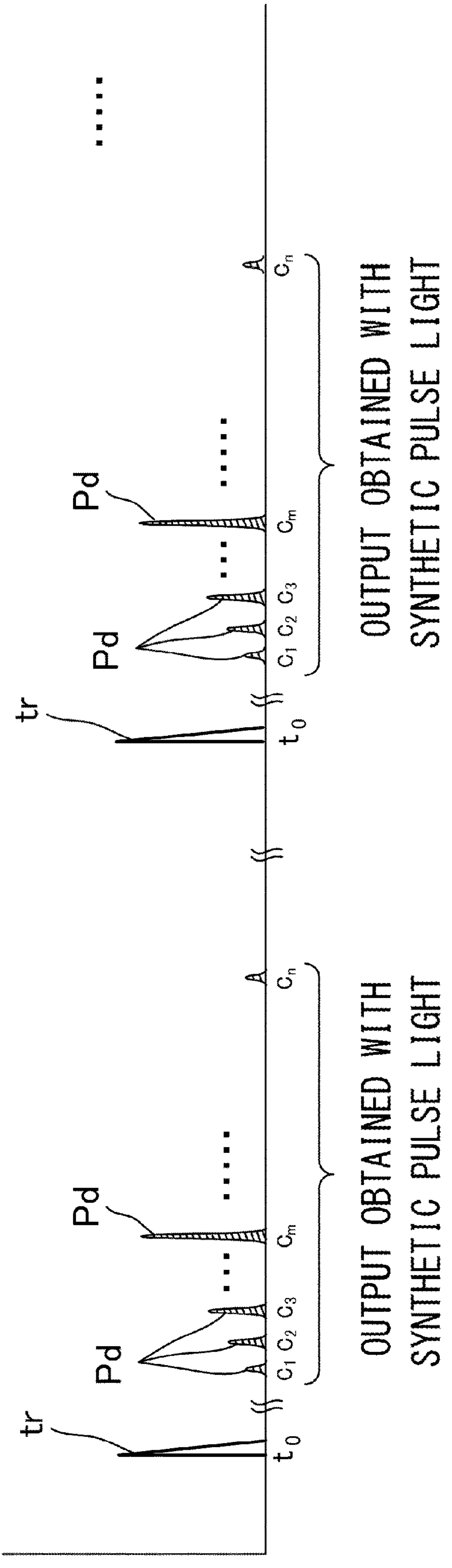
FIG. 8 is a schematic diagram illustrating integration by an integration means.

FIG. 8 is a schematic diagram illustrating integration by the integration means. In FIG. 8, the oscillation time of the pulse laser of the pulse laser source 111 is to. In FIG. 8, each small pulse output Pd indicated by a solid line is output obtained from split pulsed light beams radiated to the tablet P. Since one split pulsed light is light emitted from one channel of the arrayed waveguide grating 14, the corresponding pulse output Pd is integrated (time-integrated) at that portion. That is, the pulse output Pd of each of the channels $C_1$ to $C_n$ is integrated in the pulse, and the values become the measurement values $v_1$ to $v_n$.

In addition, since the synthetic pulsed light is radiated multiple times, each of the measurement values $v_1$ to $v_n$ is integrated for the synthetic pulsed light. That is, $v_1$ in the radiation of the next synthetic pulsed light is added to $v_1$ of the previous time, $v_2$ is added to $v_2$ of the previous time, and . . . $v_n$ is added to $v_n$ of the previous time. This is repeated up to the output data in the last radiation of the synthetic pulsed light.

A trigger signal tr indicating the reference time $t_0$ is input to the FPGA 61 used as the integration means 6. For each output value from the AD converter 21, the FPGA 61 is programmed in advance so as to specify a value (value obtained by digitizing the pulse output Pd) in each of the channels $C_1$ to $C_n$ with reference to the trigger signal tr and perform multiple integration (integration in each pulse output Pd and integration in the synthetic pulsed light) as described above.

Each of the FPGAs 61 and 54 as the integration means 6 and 60 outputs data (value of each of the channels $C_1$ to $C_n$) integrated in each channel as a data set to the calculation means 3. This data set corresponds to $v_1$ to $v_n$ and $V_1$ to $V_n$ described above.

Note that, a gate signal (not illustrated) is input to the FPGAs 61 and 54 in order to specify a time zone (gate) in which integration processing in the pulse is performed in each of the channels $C_1$ to $C_n$. In this embodiment, the calculation means 3 is configured to generate gate signals for the FPGAs 61 and 54.

Since the integration means 6 is configured in which the integration is performed for all of the pulsed light beams radiated to one tablet P multiple times at the time at which the outputs from the light receiver 2 are considered to have the same wavelength, and thus the entire average spectral transmission spectrum is obtained for one tablet P. In this configuration, even when the components of the tablet P vary depending on the location on the tablet P, the entire average spectral transmission spectrum can be instantaneously measured.

Alternatively, there is a case where it is desired to measure the variation itself in components on the tablet P depending on the location in the tablet P. In this case, the pulsed light beams radiated multiple times are grouped, integration is performed for each group, and the integration results for the groups are compared with each other.

Specifically, the tablet spectroscopic measurement apparatus includes a tablet placement mechanism in which a region of the pulsed light radiation corresponding to a first group in the pulsed light radiation performed multiple times is set to a first region of the light incident surface of the tablet P, and a region of the pulsed light irradiation corresponding to a second group is set to a second region different from the first region of the light incident surface of the tablet P. The tablet movement mechanism 400 described above is a mechanism for moving the tablet P, and since the beam patterns M are arranged on a straight line when the pulsed light is radiated multiple times, the grouping can be easily performed in the integration performed by the integration means 6. That is, the tablet movement mechanism 400 can be used as it is as the tablet placement mechanism for variation measurement.

Figure 9:
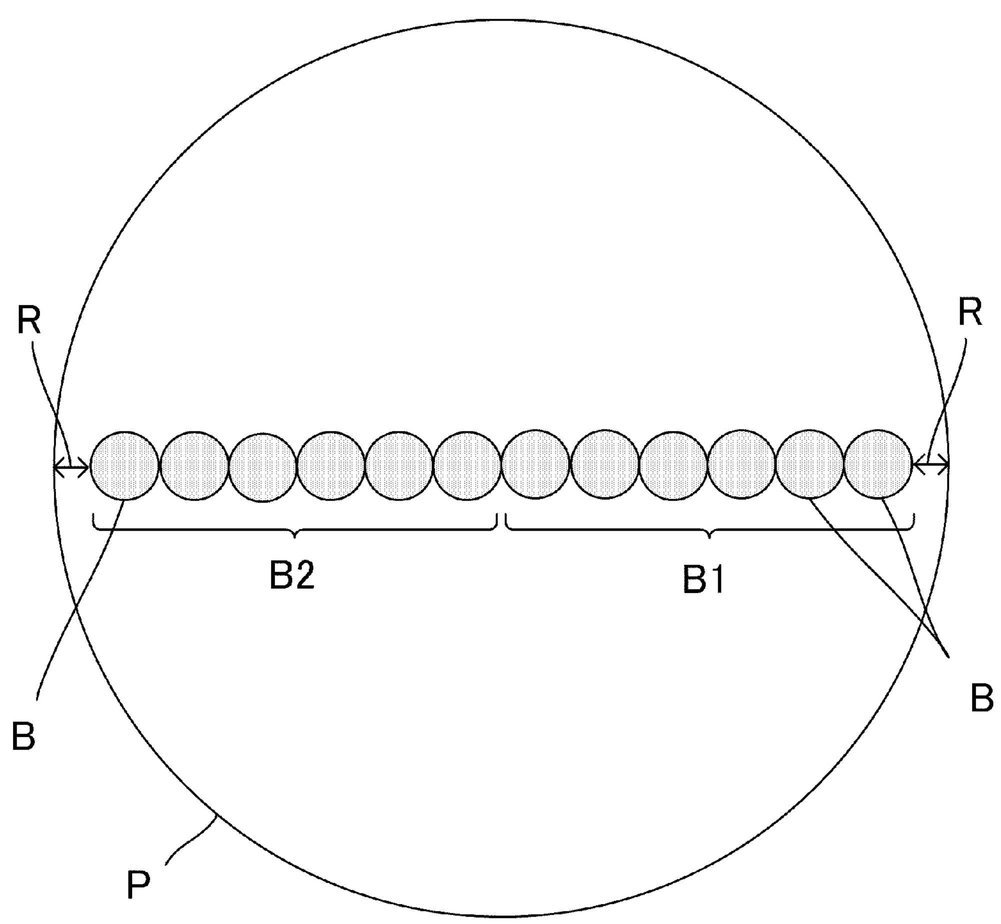
FIG. 9 is a schematic view illustrating grouping of pulsed light irradiation for measuring variations in components of tablets depending on locations of the tablets.

In this respect, description will be made with reference to FIG. 9. FIG. 9 is a schematic view illustrating grouping of pulsed light irradiation for measuring variations in components of the tablet depending on locations on the tablet.

In the example illustrated in FIG. 9, the light incident surface of the tablet P is divided into two regions, and the pulsed light irradiation is divided into two groups. For example, it is assumed that a scoring line is formed at the center of the tablet P, and the tablet P is divided into two regions with the scoring line as a boundary.

In the example illustrated in FIG. 9, similarly to FIG. 7, 12 times of pulsed light irradiation are performed (12 beams are present). Therefore, a region in which the first six times of pulsed light irradiation is performed is a first group B1, and a region in which the next six times of pulsed light irradiation is performed is another second group B2.

Figure 10:
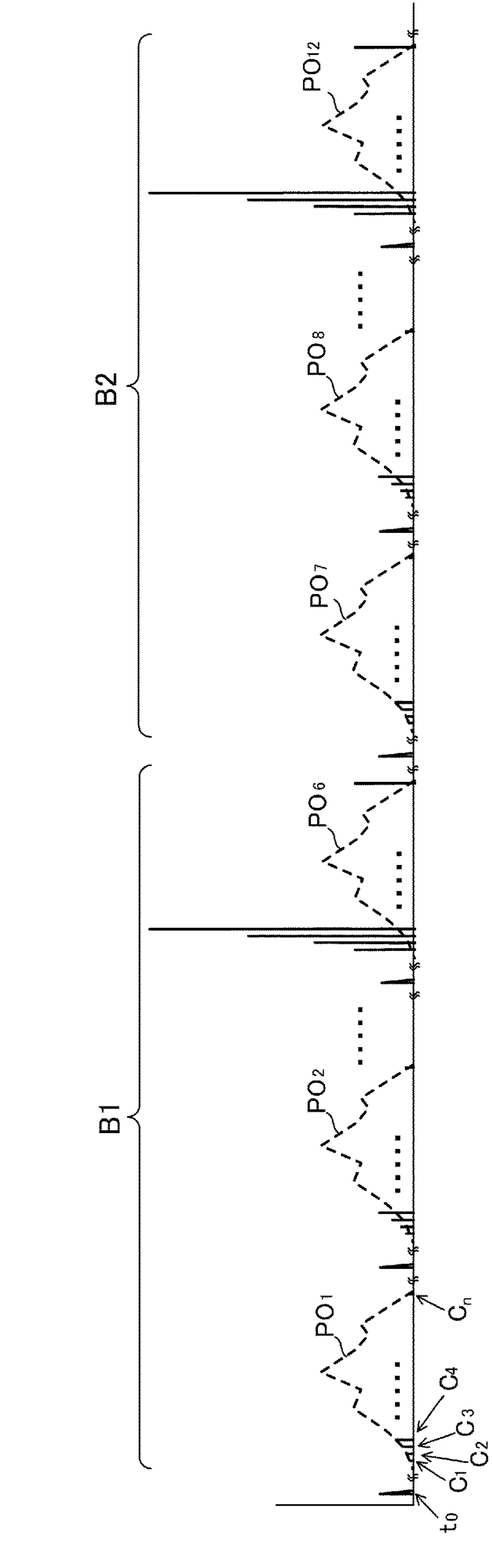
FIG. 10 is a schematic diagram illustrating integration performed by an integration means in the example illustrated in FIG. 9.

FIG. 10 is a schematic diagram illustrating integration performed by the integration means in the example illustrated in FIG. 9.

Similarly to FIG. 9, the integration means 6 performs integration in each channel (that is, for each value at the time at which the light having the same wavelength is considered to be received). At this time, as illustrated in FIG. 10, the integration is ended at a time at which the integration in the pulsed light irradiation performed up to the first six times is performed, a value at that time is set to an integration value of each channel in the first group B1. Then, in the pulsed light irradiation performed next six times, the integration is separately performed, and a value at that time is set to an integration value of each channel in the second group B2.

Similarly, the FPGA 61 can be used as the integration means 6 that performs such integration, and the FPGA 61 is programmed in advance such that the above-described calculation is performed.

A reference FPGA 54 for integrating the output from the reference light receiver 52 may perform integration for all the pulsed light irradiation in each channel and output an integration value to the calculation means, particularly without grouping, but unlike this, it is preferable to perform output after grouping. That is, similarly, in the pulsed light irradiation performed one to six times, integration is performed in each channel, and the result is set to a reference data set for the first group B1 (collection of the reference spectral intensities). In the pulsed light irradiation performed seven to 12 times, integration is performed in each channel, and the result is set to a reference data set for the second group B2. In this manner, since the measurement light is compared with the intensity of the reference light obtained by splitting the same light, the measurement accuracy is improved.

In the above-described example, the pulsed light is radiated 12 times, but the same result is obtained when the pulsed light is radiated any one of two time or more. Furthermore, even in the grouping, grouping into two is not necessary, and integration may be performed by grouping into three or more.

Figures 11A, 11B:
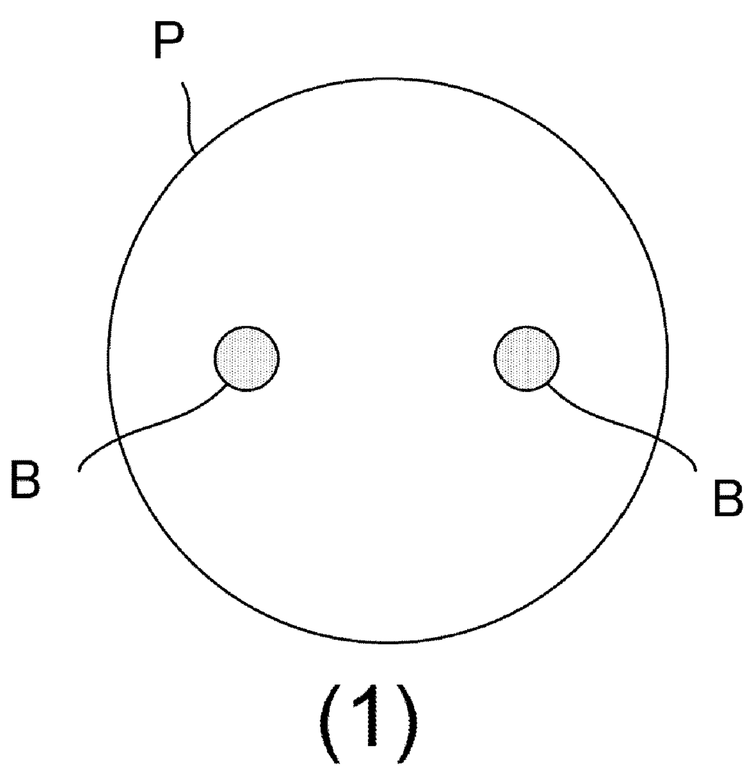
FIGS. 11A and 11B are views illustrating variations when irradiation is performed multiple times.

FIGS. 11A and 11B are views illustrating variations when irradiation is performed multiple times. As illustrated in FIG. 11A, when the pulsed light is radiated multiple times, an irradiation pattern may be applied one by one in centers of two regions divided by center boundary line. As illustrated in FIG. 11B, a pattern may be applied such that three beams are radiated at equal intervals.

Next, the overall operation of the tablet spectroscopic measurement apparatus of the embodiment will be described. The following description is also a description of the tablet spectroscopic measurement method of the embodiment.

In a case where spectroscopic measurement is performed using the spectroscopic measurement apparatus according to the embodiment, a measurement condition setting program 34 is executed, and a signal for specifying an integration condition is input to the FPGAs 61 and 54. Then, the tablet P is placed on the receiving jig 4, and the pulsed light source 11 is operated. In the pulsed light source 11, the pulsed light emitted from the pulse laser source 111 is broadened by the nonlinear element 112, split according to wavelengths by the arrayed waveguide grating 14, and then transmitted through each delay fiber 131 of the bundle fiber 13 to be delayed by an amount corresponding to the length thereof. Then, the light from each delay fiber 131 passes through the emission-end unit 15, is split by the splitter 51, and one of the light beams is radiated to the tablet P as the synthetic pulsed light. At this time, the synthetic pulsed light transmitted through the tablet P reaches the light receiver 2. Furthermore, the other split light reaches the reference light receiver 52 as the reference synthetic pulsed light.

The irradiation with the synthetic pulsed light and the incidence on each of the light receivers 2 and 52 are repeated multiple times, and the outputs obtained with each synthetic pulsed light are generated from each of the light receivers 2 and 52. Each output is sampled and digitized by the AD converters 21 and 53, and is integrated by the FPGAs 61 and 54 as the integration means 6 and 60. At this time, the FPGAs 61 and 54 perform integration under the input integration condition. Then, the data sets $v_1$ to $v_n$ of the measurement signals and the data sets $V_1$ to $V_n$ of the reference signals are input to the calculation means 3. The calculation means 3 divides each value included in the data sets $v_1$ to $v_n$ of the measurement signals by the reference intensity at the same time, which is acquired from the data sets $V_1$ to $V_n$ of the reference signals, to obtain the measurement result of the spectral transmission spectrum.

At the time of the above-described operation, in a case where an integration condition is input to perform integration for grouping, the FPGAs 61 and 54 perform integration for each group as programmed, and input the result to the calculation means 6. The measurement program 33 compares $v_1$ to $v_n$ and $V_1$ to $V_n$ for each group and calculates each spectral transmission spectrum. That is, spectral transmission spectra at different locations on one tablet P is obtained as a measurement result.

In the tablet spectroscopic measurement apparatus or the tablet spectroscopic measurement method of the embodiment, the tablet P is irradiated with the pulsed light in which the elapsed time and the wavelength correspond to each other on a one-to-one basis to perform spectroscopic measurement, and thus, it is possible to realize extremely high-speed spectroscopic measurement such as one pulse/one measurement. In addition, values at the time at which it is considered to have the same wavelength are integrated and used as measurement results, a high SN ratio can be obtained at the same time.

In the tablet spectroscopic measurement apparatus and the tablet spectroscopic measurement method, the tablet movement mechanism 400 is a mechanism for irradiating different locations on one tablet P with the pulsed light multiple times, but there may be other mechanisms. For example, a mechanism that performs step movement instead of continuous movement may be used. In this case, the movement of the tablet P is stopped at the time of each pulsed light irradiation, and the tablet P is moved by a predetermined distance between the pulsed light irradiations. In the case of such a mechanism, it is also easy to irradiate the same location with the pulsed light multiple times, and further irradiate the other same location with the pulsed light multiple times.

Note that, in the configuration in which the pulsed light is radiated with the small beam B as described above, in addition to the configuration in which the emission-end unit 15 includes the condenser lens, the beam diameter of the emitted light may be originally small, and in this case, the condenser lens may not be necessary.

Furthermore, in the embodiment, the reference spectral intensity is obtained by receiving light not passing through the tablet P by the reference light receiver 52. A reference sample having a known spectral transmission spectrum may be placed on the reference optical path, and light transmitted through the reference sample may be received by the reference light receiver 52 to obtain the reference spectral intensity based on an output of the light. In this case, the reference sample more preferably has a flat transmission characteristic in the measurement wavelength range.

Figure 12:
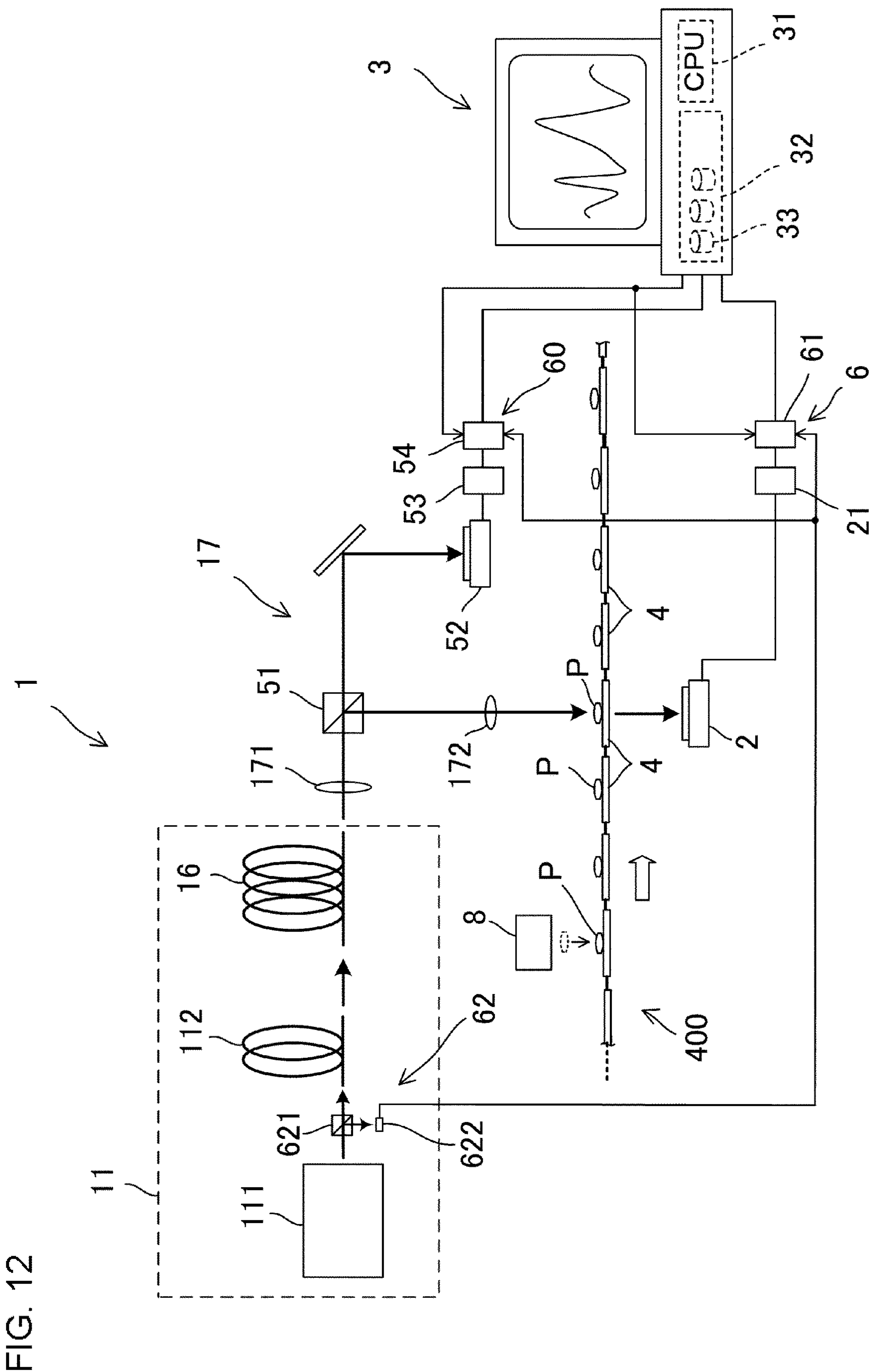
FIG. 12 is a schematic diagram of a tablet spectroscopic measurement apparatus according to a second embodiment.

Next, a tablet spectroscopic measurement apparatus according to a second embodiment will be described. FIG. 12 is a schematic diagram of the tablet spectroscopic measurement apparatus according to the second embodiment.

The second tablet spectroscopic measurement apparatus is different from the tablet spectroscopic measurement apparatus according to the first embodiment in the configuration of the pulsed light irradiation system 1. That is, in the second embodiment, the pulsed light irradiation system 1 includes a pulsed light source 11 and a stretching element 16 that pulse-stretches the pulsed light from the pulsed light source 11. The stretching element 16 is an element that pulse-stretches broadband pulsed light (SC light) emitted from the nonlinear element 112 in the pulsed light source 11 such that the elapsed time in the pulse and the wavelength of the light correspond to each other on a one-to-one basis. In the first embodiment, the arrayed waveguide grating 14 and the bundle fiber 13 constitute a correspondence unit, but the stretching element 16 is provided instead. At a wavelength ranging from 900 nm to 1300 nm, a normal single-mode silica fiber exhibits a normal dispersion characteristic, and thus is suitably used as the stretching element 16.

An irradiation optical system 17 is provided between the stretching element 16 and the receiving jig 4. The irradiation optical system 17 may appropriately include a collimator lens 171 that collimates the light from the stretching element 16, and a condenser lens 172 that forms a small beam B as in the first embodiment.

Also in this embodiment, integration means 6 and 60 that integrate the output from the light receiver 2 between pulses are provided. In this embodiment, the measurement light is broadband pulsed light (broadband stretched pulsed light) that is pulse-stretched by the stretching element 16, and is radiated multiple times as in the first embodiment. The integration means 6 and 60 are configured to integrate a value at a time at which the pulse outputs output from the light receivers 2 and 52 when the broadband stretched pulsed light is radiated each time are considered to have the same wavelength. That is, processing of integrating the values of the same elapsed time as the values of the same wavelength is performed on the basis of the time to of the trigger signal transmitted from the trigger signal generation unit 62. Similarly, the integration means 6 is an FPGA 61, and is programmed in advance to perform such processing.

Similarly, in the second embodiment, effects of being capable of performing the high-speed and high-accuracy tablet spectroscopic measurement can be obtained.

Figure 13:
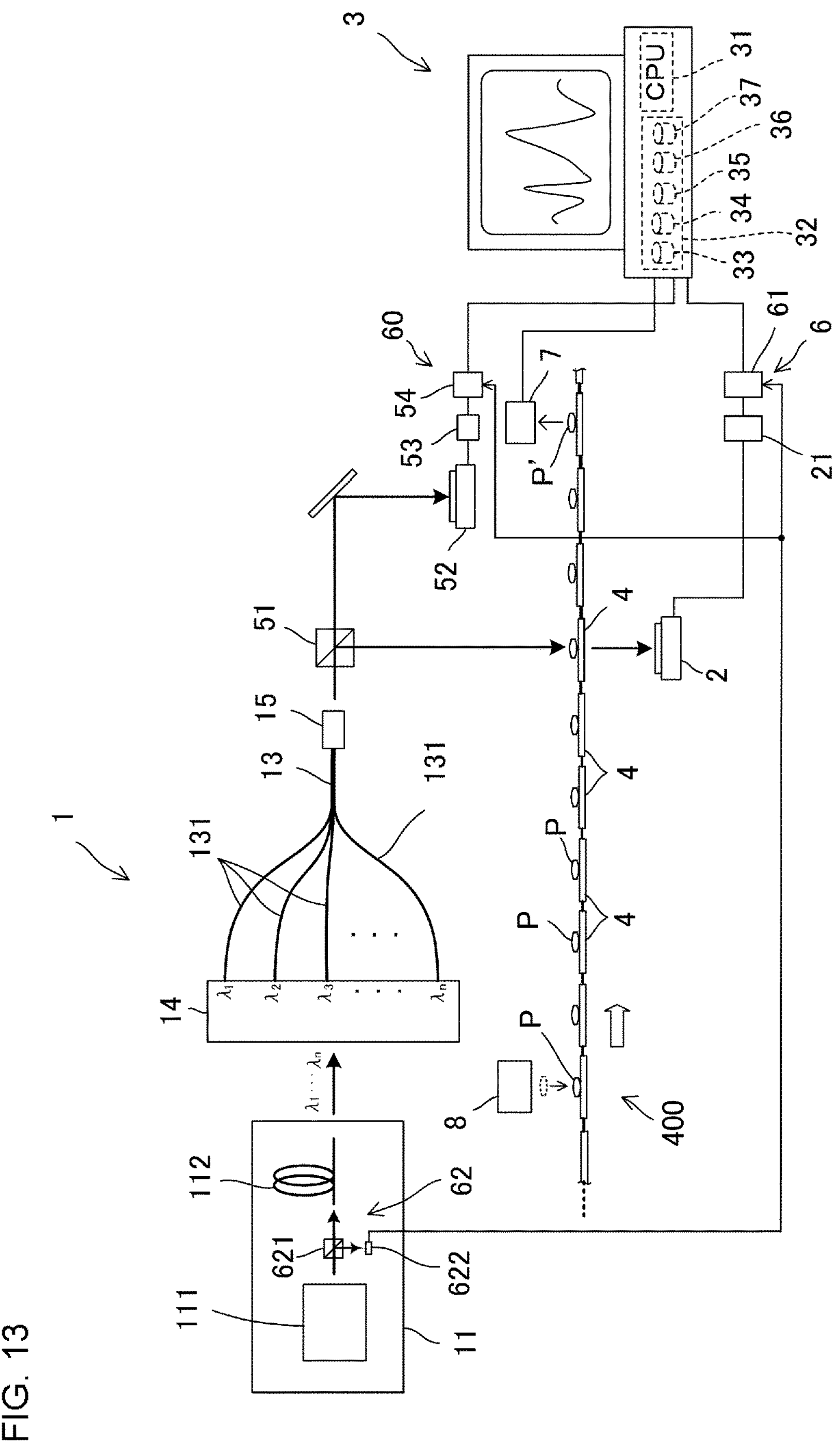
FIG. 13 is a schematic diagram of a tablet inspection apparatus according to an embodiment.

Next, the tablet inspection apparatus according to the embodiment of the invention will be described. The following description is also a description of the tablet inspection method of the embodiment of the invention. FIG. 13 is a schematic diagram of the tablet inspection apparatus according to the embodiment.

The tablet spectroscopic measurement apparatus of the above-described embodiment may be configured as an apparatus that performs spectroscopic measurement to inspect the quality of the tablet P, and thus can be a tablet inspection apparatus. There may be various quality inspections for the tablet P, and for example, there may be determination of the quality of the tablet P. The following description is made as an example of this.

Specifically, the tablet inspection apparatus of the embodiment is configured to include a determination means that determines the quality of the tablet P in the spectroscopic measurement apparatus of the first embodiment. However, the spectroscopic measurement apparatus of the second embodiment may be provided with the determination means.

As illustrated in FIG. 13, the determination means is configured with a quality determination program 35 implemented on the calculation means. The quality determination program 35 is a program executed using an execution result of the measurement program 33 as an argument. In addition, the tablet inspection apparatus includes an exclusion mechanism 7 that excludes a defective tablet P from a manufacturing line and prevents the tablet P from being shipped. Furthermore, in the calculation means 3, an exclusion signal output program 36 for outputting an exclusion signal to the exclusion mechanism 7 is implemented. Moreover, a sequence control program 37 is implemented on the calculation means 3 in order to control the sequence of the entire inspection including the quality determination.

FIG. 14 is a diagram illustrating an outline of the quality determination program. As illustrated in FIG. 14, the quality determination program 35 includes a spectrum quantification module 351 and a determination module 352. As described above, the measurement program 33 compares a spectral transmission spectrum $S_1$, which is the integrated output data, with reference spectral intensity $S_0$, which is the similarly integrated output data, and further takes the logarithm of the reciprocal to calculate an absorbance spectrum $S_2$. Then, the quality determination program 35 is executed using the calculated absorbance spectrum $S_2$ as an argument. In the quality determination program 35, the spectrum quantification module 351 is a module that obtains an amount (hereinafter, referred to as a quantitative value) Q that can be compared with the reference value based on the absorbance spectrum $S_2$. The determination module 352 is a module that compares the calculated quantitative value Q with the reference value, performs quality determination, and outputs the result as a program execution result.

The absorbance spectrum $S_2$ as an argument is the sum of the absorbance spectra of the components contained in the tablet P. It is also possible to determine the quality of the tablet P by the amount of all the contained components, but since it is too complicated, the quality is determined by the amount of a specific component. The specific component is a component with which the quality of the tablet P can be determined, and is, for example, an active component in a case where the tablet P is a pharmaceutical product.

In this embodiment, the quality is determined with the absorbance spectrum $S_2$ in the near-infrared range. As is well known, in the near-infrared range, absorption bands of many materials overlap each other, and it is difficult to directly obtain the amount of the target component from the calculation result of the absorbance spectrum. For this reason, the spectrum quantification module 351 often adopts a chemometrics method.

The chemometrics method is a statistical method using multivariate analysis. In order to quantify the component amount, it is necessary to obtain a calibration curve. In order to obtain the calibration curve, first, the calibration curve is created by performing spectrum measurement on a large number of samples (tablets P) in which the amount of the target components is known and performing multiple regression analysis. When a sample of which content is unknown is quantified, the amount of the target components is predicted using the obtained regression coefficient, and the predicted value is used as a quantitative value. As a regression analysis method, methods such as principal component analysis (PCA), principal component regression analysis (PCR), and partial least square regression (PLS regression) (PLSR) analysis are known. Since the chemometrics methods other than the PLSR are explained in Non Patent Literature 2 and other documents, further explanation will be omitted.

As illustrated in FIG. 14, in the quality determination program 35, the spectrum quantification module 351 is executed and then the determination module 352 is executed. The determination module 352 is a module that compares the quantitative value Q obtained by the spectrum quantification module 351 with the reference value and determines the quality. The reference value and the tolerance of the deviation from the reference value are given as constants to the determination module 352. The determination module 352 determines the quality according to these, and outputs the result as an execution result of the quality determination program 35. When the execution result indicating the defective product is returned from the quality determination program 35, the sequence control program 37 executes the exclusion signal output program 36 and outputs the exclusion signal to the exclusion mechanism 7. Accordingly, a tablet P' is excluded from the manufacturing line.

Note that, the amount Q of the target component may be indicated as a ratio (content ratio) to the whole, or may be indicated as an absolute value (content). In a case where the absolute value is calculated, a calibration curve is created such that the absolute value can be calculated, or in the case of the weight ratio, the weight of the tablet P is separately measured and calculated.

Furthermore, in practice, preprocessing such as smoothing, primary differentiation, or secondary differentiation is performed on output data D, and thereafter, the quantitative value Q is acquired by applying the regression coefficient obtained by the PLSR. At this time, a wavenumber domain having the characteristic of the target component may be selected.

As the exclusion mechanism 7, a mechanism including a nozzle that sucks a defective tablet P' with air and causes the tablet P' to be adsorbed to the distal end can be adopted. The nozzle is configured to be capable of holding and moving the tablet P' to a disposal box. In addition, a configuration in which the tablet P' is blown by air blow and put into the disposal box or a configuration in which the tablet P' is picked up and removed by a robot can be adopted.

Next, the overall operation of the tablet inspection apparatus of the embodiment will be described. The following description is also a description of the tablet inspection method of the embodiment.

The manufactured tablets P are placed on the receiving jigs 4 one by one by the placement mechanism 8. Each of the receiving jigs 4 on which the tablet P is placed is moved by the tablet movement mechanism 400 and passes through the irradiation position. At this time, each tablet P is irradiated with the pulsed light multiple times. The pulsed light radiated multiple times and transmitted through the tablet P reaches the light receiver 2, and generates the output from the light receiver 2. The output from the light receiver 2 is converted into digital data by the AD converter 21, integrated by the FPGA 61 as the integration means 6, and input to the calculation means 3. Similarly, the output from the reference light receiver 52 is digitized and integrated, and is input to the calculation means 3.

In the calculation means 3, the measurement program 33 calculates the absorbance spectrum $S_2$, and the quality determination program 35 to which the calculation result is delivered determines the quality of the tablet P. When the execution result indicating the defective product is returned, the sequence control program 37 executes the exclusion signal output program 36, and the exclusion mechanism 7 excludes the tablet P' determined to be the defective product from the manufacturing line. In this manner, quality determination is sequentially performed for the tablet P on each receiving jig 4, and the tablet P' determined to be a defective product is excluded.

In the tablet inspection apparatus or tablet inspection method of the above-described embodiment, since the inspection of the tablet P is performed using the high-speed and high-accuracy spectroscopic measurement apparatus and spectroscopic measurement method, it is possible to realize the highly reliable inspection in real time in the manufacturing line without impairing the productivity. For this reason, it is sufficiently possible to inspect all the tablets P.

Note that, the spectroscopic measurement of the tablet is not limited to the manufactured tablet, and may be performed on the tablet (semi-product) being manufactured. Basically, component inspection is performed before coating, but there is a possibility that the component inspection can be performed in a case where the coating component is capable of spectrally being separated even after the coating.

In the above-described embodiment, it is not essential to quantify the specific component in order to determine the quality of the tablet P. For example, there is a characteristic wavelength in a spectral absorption characteristic of the tablet P, and the quality may be determined only by the value thereof. In this case, the value of the wavelength is compared with the reference value from the absorbance spectrum to determine the quality. Since only a specific wavelength is required, it is not necessary to obtain a spectrum (a value at each wavelength in a certain wavelength range). The quality can be determined only by dividing the measurement value at the wavelength by the reference intensity and comparing the result with the reference value.

Note that, in a case where the measurement program 33 is configured to calculate each absorbance spectrum after integration is performed for the grouping, it is also possible to check variations in specific components of the tablet P depending on locations as part of the product inspection. In this case, the target component is quantified for each absorbance spectrum obtained, and it is possible to check whether a difference between the quantitative values is within a predetermined range. There may be a case where the quality is checked by comparing the absorbance spectra without performing quantification. This is because a large difference in the absorbance spectrum means that the tablet P is not homogeneous.

In each of the above-described embodiments, as the pulsed light source 11, an amplified spontaneous emission (ASE) light source, a super-luminescent diode (SLD) light source, or the like may be adopted in addition to the light source that includes the pulse laser source 111 and emits the SC light with the nonlinear element 112.

ADVANTAGEOUS EFFECTS OF DISCLOSURE

As will be described below, in the tablet spectroscopic measurement method or the tablet spectroscopic measurement apparatus according to the disclosed invention, the tablet is irradiated with the pulsed light in which the elapsed time and the wavelength correspond to each other on a one-to-one basis to perform spectroscopic measurement, and thus, it is possible to realize extremely high-speed spectroscopic measurement. In addition, since the size of the beam of the pulsed light to be radiated on the light incident surface of the tablet is smaller than the size of the light incident surface of the tablet, it is not necessary to accurately position the tablet at the time of irradiation, and problems such as variations in measurement conditions due to deviation of the beam of the pulsed light from the tablet are suppressed.

At this time, when two or more beams of pulsed light are provided on the light incident surface in a state of not overlapping each other, the above-described effect is further enhanced. In addition, it is possible to perform spectroscopic measurement at least two locations on the light incident surface, which is suitable for averaging measurement results or measuring variations in spectral characteristic on the surface.

Furthermore, when one tablet is irradiated with the pulsed light multiple times and the different locations on the light incident surface is irradiated with the pulsed light multiple times, it is possible to measure the distribution of the spectral transmission characteristic and measure the variation (difference depending on the location) in the spectral transmission characteristic, which is suitable in this respect.

Furthermore, when one tablet is irradiated with the pulsed light multiple times, and a value at a time at which the outputs from the light receiver at the time of multiple times of integration with the pulsed light are considered to have the same wavelength is integrated, the SN ratio is increased, and thus measurement accuracy is improved.

Furthermore, when the light incident surface of the tablet is divided into the first and second regions, and the outputs from the light receiver receiving the pulsed light incident on each region are separately integrated, an effect is obtained in which the SN ratio is improved when the distribution of the spectral transmission characteristic is measured or the variation is measured.

Furthermore, in the configuration in which the tablet being moved is irradiated with the pulsed light to perform the spectroscopic measurement, and the high-speed measurement is performed, the present invention can be easily applied to the tablet being moved in the manufacturing line.

Furthermore, in the tablet inspection method or tablet inspection apparatus according to the disclosed invention, it is possible to determine the quality of the tablet as part of the quality inspection while obtaining the above-described effect. Therefore, it can greatly contribute to manufacturing high-quality and highly reliable tablets with high productivity.

What is claimed is:

1. A tablet spectroscopic measurement method for measuring a spectral transmission spectrum of a tablet, the method comprising:

a moving step of moving the tablet so as to pass through an irradiation position without being stopped;

an irradiation step of irradiating, a plurality of times, one tablet passing through the irradiation position with pulsed light in which an elapsed time in each pulse and a wavelength correspond to each other on a one-to-one basis; and a calculation processing step of performing calculation processing on an output from a light receiver that receives transmission light from the tablet irradiated with the pulsed light in the irradiation step, and obtaining the spectral transmission spectrum of the tablet, wherein a size of a beam of the pulsed light in the irradiation step on a light incident surface of the tablet is smaller than the size of the light incident surface of the tablet, wherein in the irradiation step, the pulsed light is irradiated onto different portions within the light incident surface of the one tablet, the method further comprising an integration step of integrating the output from the light receiver, wherein the integration step includes a step of integrating, for respective wavelengths, values of the output from the light receiver at times at which it is regarded that the light receiver receives light having the same wavelength, and the calculation processing step includes a step of obtaining the average spectral transmission spectrum of the different portions according to respective integrated values for respective wavelengths.

2. The tablet spectroscopic measurement method according to claim 1, wherein the beam of the pulsed light has such a size that two or more beams of the pulsed light can be incident to the light incident surface in a state of not overlapping each other.

3. A tablet inspection method comprising:

a measurement step of performing the tablet spectroscopic measurement method according to claim 1 to obtain a spectral transmission spectrum of a tablet; and a determination step of determining quality of the tablet based on the spectral transmission spectrum obtained in the measurement step.

4. A tablet spectroscopic measurement method for measuring a spectral transmission spectrum of a tablet, the method comprising:

a moving step of moving the tablet so as to pass through an irradiation position without being stopped;

an irradiation step of irradiating, a plurality of times, one tablet passing through the irradiation position with pulsed light in which an elapsed time in each pulse and a wavelength correspond to each other on a one-to-one basis; and a calculation processing step of performing calculation processing on an output from a light receiver that receives transmission light from the tablet irradiated with the pulsed light in the irradiation step, and obtaining the spectral transmission spectrum of the tablet, wherein a size of a beam of the pulsed light in the irradiation step on a light incident surface of the tablet is smaller than the size of the light incident surface of the tablet, wherein in the irradiation step, the pulsed light is irradiated onto different portions within the light incident surface of the one tablet, the method further comprising an integration step of integrating the output from the light receiver, wherein multiple irradiations of the pulsed light onto one tablet are divided into a plurality of groups onto a plurality of regions in the light incident surface of the tablet, the integration step includes:

a step of integrating, for irradiations of each of the plurality of groups, values at respective times that are regarded as being of the same wavelength, wherein the calculation processing step includes:

a step of obtaining, for each of the plurality of groups, a spectral transmission spectrum of the region corresponding to the group according to values integrated for respective wavelengths; and a step of determining the quality of the tablet based on the spectral transmission spectra of the plurality of regions.

5. A tablet inspection method comprising:

a measurement step of performing the tablet spectroscopic measurement method according to claim 4 to obtain a spectral transmission spectrum of a tablet; and a determination step of determining quality of the tablet based on the spectral transmission spectrum obtained in the measurement step.

6. A tablet spectroscopic measurement apparatus that measures a spectral transmission spectrum of a tablet, the apparatus comprising:

a movement mechanism structured to move the tablet so as to pass through an irradiation position without being stopped;

a pulsed light irradiation system that includes a pulsed light source emitting pulsed light in which an elapsed time in each pulse and a wavelength correspond to each other on a one-to-one basis, and the pulsed light irradiation system being structured to irradiate one tablet passing through the irradiation position a plurality of times with the pulsed light;

a light receiver that is disposed at a position receiving transmission light from the tablet which is irradiated with the pulsed light by the pulsed light irradiation system; and a calculation means that performs calculation processing on an output from the light receiver, and obtains the spectral transmission spectrum of the tablet, wherein a size of a beam of the pulsed light radiated by the pulsed light irradiation system on a light incident surface of the tablet is smaller than the size of the light incident surface of the tablet, and wherein the pulsed light is irradiated onto different portions within the light incident surface of the one tablet, the apparatus further comprising an integration means structured to integrate the output from the light receiver, and wherein the integration means is structured to integrate, for respective wavelengths, values of the output from the light receiver at times at which it is regarded that the light receiver receives light having the same wavelength, and the calculation means is structured to obtain the average spectral transmission spectrum of the different portions according to respective integrated values for respective wavelengths.

7. The tablet spectroscopic measurement apparatus according to claim 6, wherein the beam of the pulsed light has such a size that two or more beams of the pulsed light can be incident to the light incident surface in a state of not overlapping each other.

8. A tablet inspection apparatus comprising:

the tablet spectroscopic measurement apparatus according to claim 6; and a determination means that determines quality of the tablet based on a spectral transmission spectrum that is a measurement result obtained by the tablet spectroscopic measurement apparatus.

9. A tablet spectroscopic measurement apparatus that measures a spectral transmission spectrum of a tablet, the apparatus comprising:

a movement mechanism structured to move the tablet so as to pass through an irradiation position without being stopped;

a pulsed light irradiation system that includes a pulsed light source emitting pulsed light in which an elapsed time in each pulse and a wavelength correspond to each other on a one-to-one basis, and the pulsed light irradiation system being structured to irradiate one tablet passing through the irradiation position a plurality of times with the pulsed light;

a light receiver that is disposed at a position receiving transmission light from the tablet which is irradiated with the pulsed light by the pulsed light irradiation system; and a calculation means that performs calculation processing on an output from the light receiver, and obtains the spectral transmission spectrum of the tablet, wherein a size of a beam of the pulsed light radiated by the pulsed light irradiation system on a light incident surface of the tablet is smaller than the size of the light incident surface of the tablet, and wherein the pulsed light is irradiated onto different portions within the light incident surface of the one tablet, the apparatus further comprising an integration means structured to integrate the output from the light receiver, multiple irradiations of the pulsed light onto one tablet are divided into a plurality of groups onto a plurality of regions in the light incident surface of the tablet, the integration means is structured to integrate, for irradiations of each of the plurality of groups, values of the output from the light receiver at times at which it is regarded that the light receiver receives light having the same wavelength, and wherein the calculation means is structured:

to obtain, for each of the plurality of groups, a spectral transmission spectrum of the region corresponding to the group according to values integrated for respective wavelengths; and to determine the quality of the tablet based on the spectral transmission spectra of the plurality of regions.

10. A tablet inspection apparatus comprising:

the tablet spectroscopic measurement apparatus according to claim 9; and a determination means that determines quality of the tablet based on a spectral transmission spectrum that is a measurement result obtained by the tablet spectroscopic measurement apparatus.

* * * * *